United States Patent [19]
Harris et al.

[11] Patent Number: 5,794,806
[45] Date of Patent: *Aug. 18, 1998

[54] QUICK-ON FUEL CAP

[75] Inventors: Robert S. Harris; Jeffery Griffin, both of Connersville, Ind.

[73] Assignee: Stant Manufacturing Inc., Connersville, Ind.

[*] Notice: The term of this patent shall not extend beyond the expiration date of Pat. No. 5,480,055.

[21] Appl. No.: 566,868

[22] Filed: Dec. 4, 1995

Related U.S. Application Data

[63] Continuation-in-part of Ser. No. 239,217, May 6, 1994, Pat. No. 5,480,055.

[51] Int. Cl.$^6$ ............................................. B65D 51/16
[52] U.S. Cl. .................... 220/203.26; 220/203.24; 220/203.25; 220/290; 220/295; 220/303; 220/DIG. 33
[58] Field of Search ................ 220/203.23, 203.24, 220/203.25, 203.26, 290, 295, 303, 304, DIG. 33

[56] References Cited

U.S. PATENT DOCUMENTS

| | | |
|---|---|---|
| 1,738,893 | 12/1929 | Grady . |
| 2,964,121 | 12/1960 | Stannard . |
| 2,990,971 | 7/1961 | Enell . |
| 3,006,499 | 10/1961 | Corbett . |
| 3,111,239 | 11/1963 | Ivins . |
| 3,813,904 | 6/1974 | Wallskog . |
| 3,820,680 | 6/1974 | Friend . |
| 3,893,487 | 7/1975 | Engelking . |
| 3,937,357 | 2/1976 | Burgess ........................ 220/203.26 |
| 3,938,692 | 2/1976 | Crute . |
| 3,985,260 | 10/1976 | Evans . |
| 4,000,633 | 1/1977 | Evans . |
| 4,102,472 | 7/1978 | Sloan, Jr. . |
| 4,162,021 | 7/1979 | Crute . |
| 4,294,376 | 10/1981 | Keller . |
| 4,337,873 | 7/1982 | Johnson . |
| 4,339,055 | 7/1982 | Hutzenlaub . |
| 4,436,219 | 3/1984 | Reutter . |
| 4,458,711 | 7/1984 | Flider ........................ 220/203.26 X |
| 4,498,493 | 2/1985 | Harris . |
| 4,540,103 | 9/1985 | Kasugai et al. . |
| 4,572,396 | 2/1986 | Kasugai et al. . |
| 4,676,390 | 6/1987 | Harris . |
| 4,676,393 | 6/1987 | Daniel . |
| 4,678,097 | 7/1987 | Crute . |
| 4,690,293 | 9/1987 | Uranishi et al. . |
| 4,726,488 | 2/1988 | Kasugai . |
| 4,765,505 | 8/1988 | Harris . |
| 4,779,755 | 10/1988 | Harris . |
| 4,787,529 | 11/1988 | Harris ........................ 220/203 |
| 4,795,053 | 1/1989 | Kasugai et al. . |
| 4,795,054 | 1/1989 | Brown . |
| 4,887,733 | 12/1989 | Harris . |
| 4,913,303 | 4/1990 | Harris ........................ 220/204 |
| 5,020,685 | 6/1991 | Sato et al. ........................ 220/203 |
| 5,108,001 | 4/1992 | Harris . |
| 5,110,003 | 5/1992 | MacWilliams . |
| 5,269,431 | 12/1993 | Sakata et al. . |
| 5,361,924 | 11/1994 | Muller . |
| 5,381,919 | 1/1995 | Griffin et al. . |
| 5,395,004 | 3/1995 | Griffin et al. . |
| 5,449,086 | 9/1995 | Harris . |
| 5,480,055 | 1/1996 | Harris et al. . |
| 5,540,347 | 7/1996 | Griffin ........................ 220/203.23 |

FOREIGN PATENT DOCUMENTS 1 420 252  1/1976  United Kingdom .

*Primary Examiner*—Stephen Cronin
*Attorney, Agent, or Firm*—Barnes & Thornburg

[57] ABSTRACT

A fuel cap is provided for use in the filler neck of a tank. The fuel cap includes a filler neck closure member, a handle engaged to drive the filler neck closure member, and a torsion spring coupled to the handle and to the filler neck closure member.

54 Claims, 12 Drawing Sheets

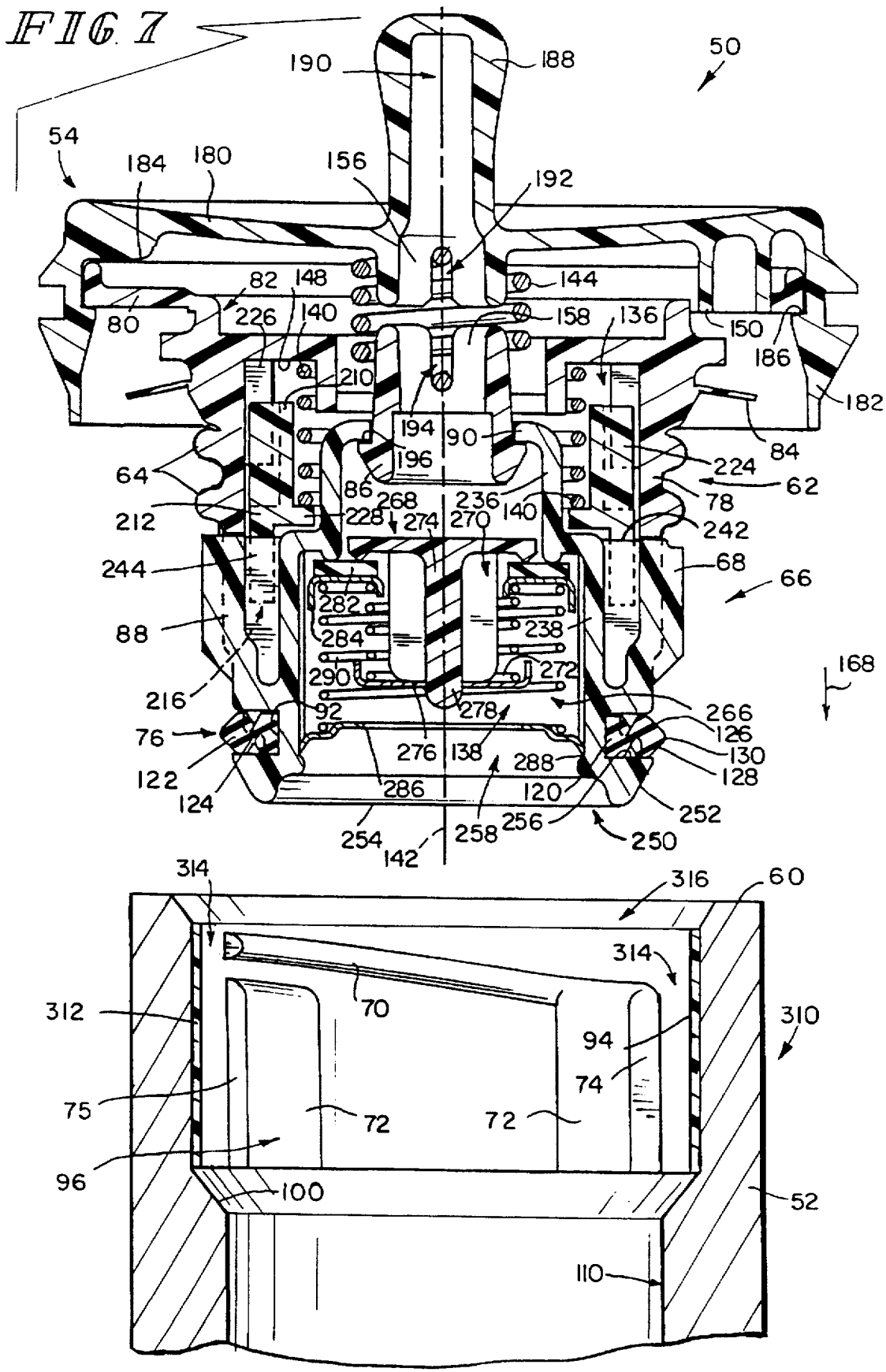

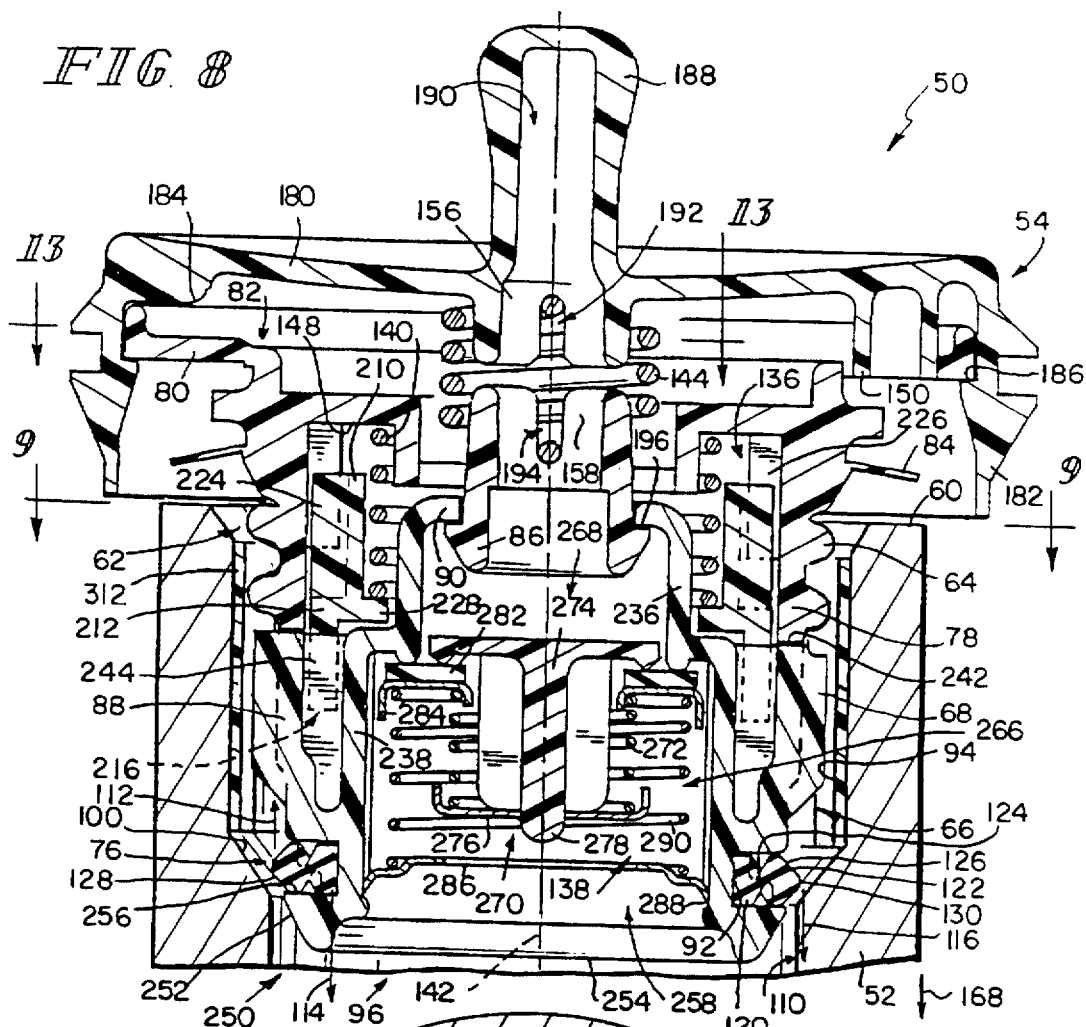

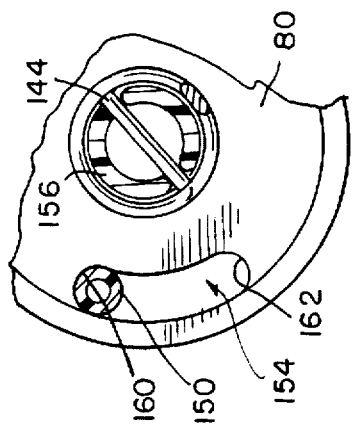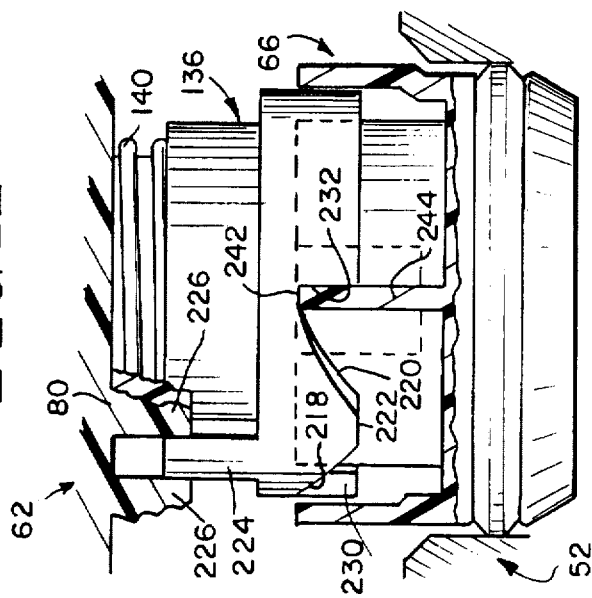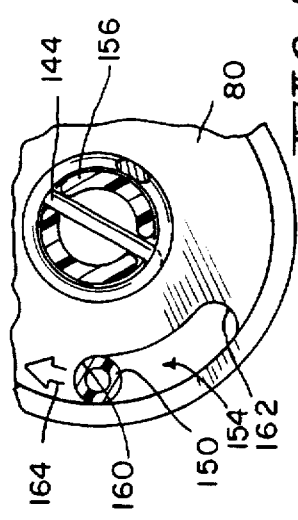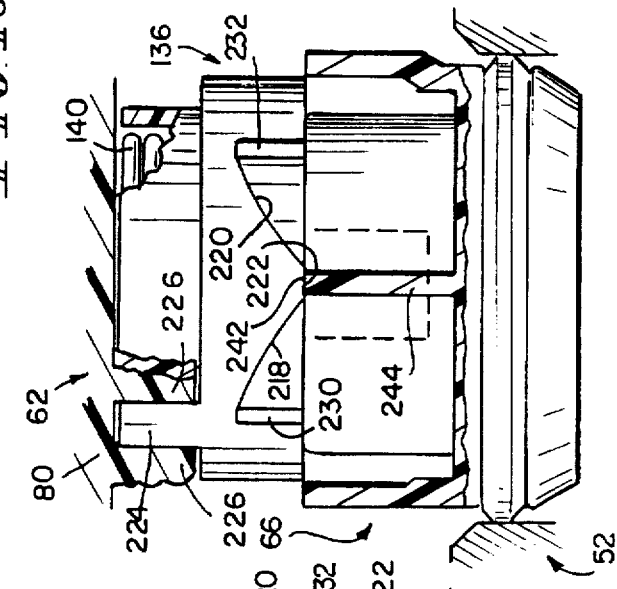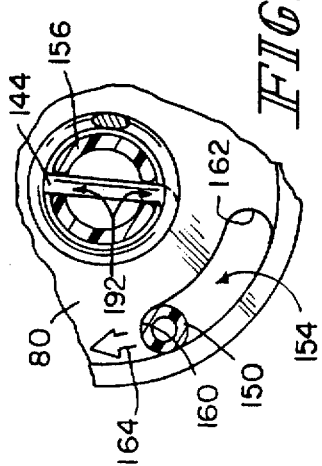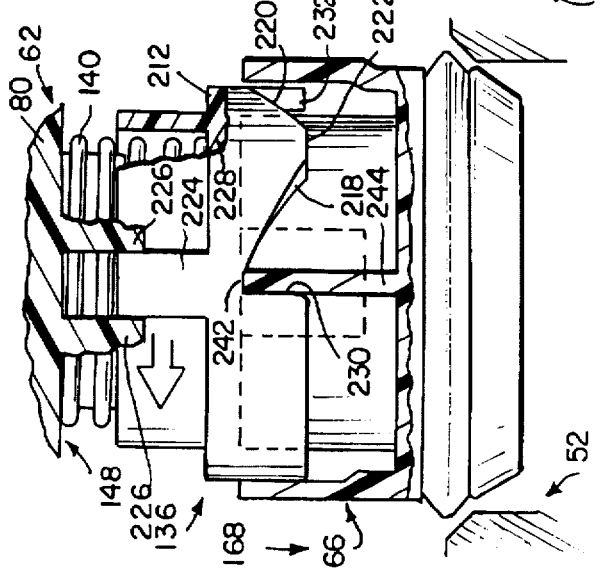

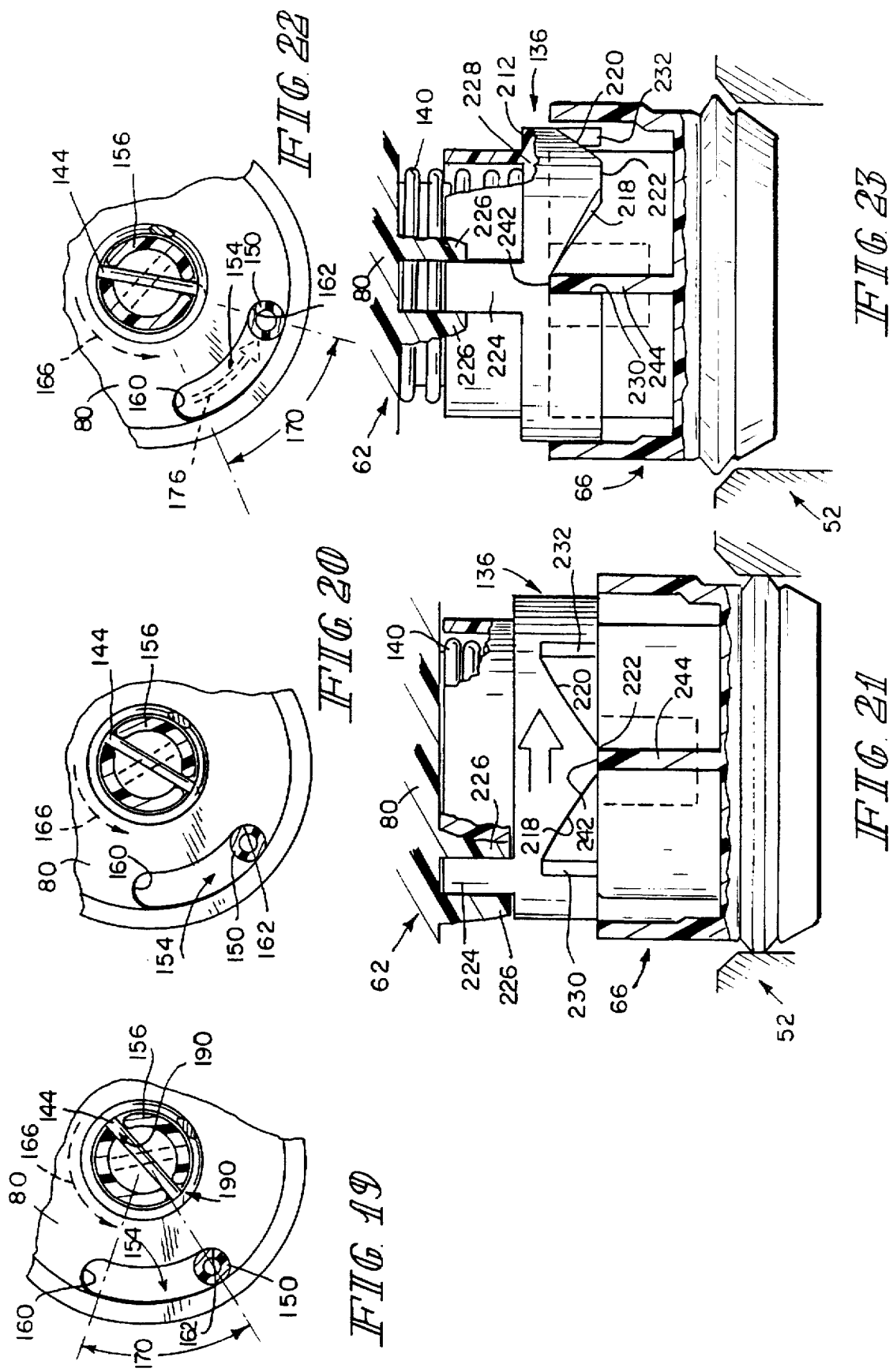

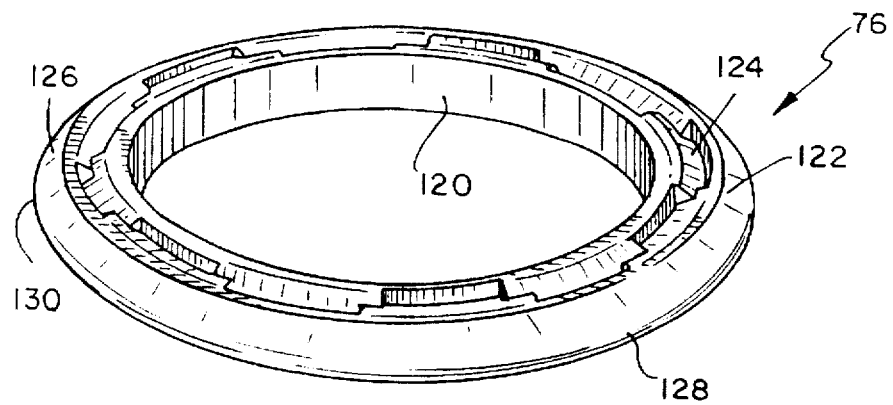
FIG. 26
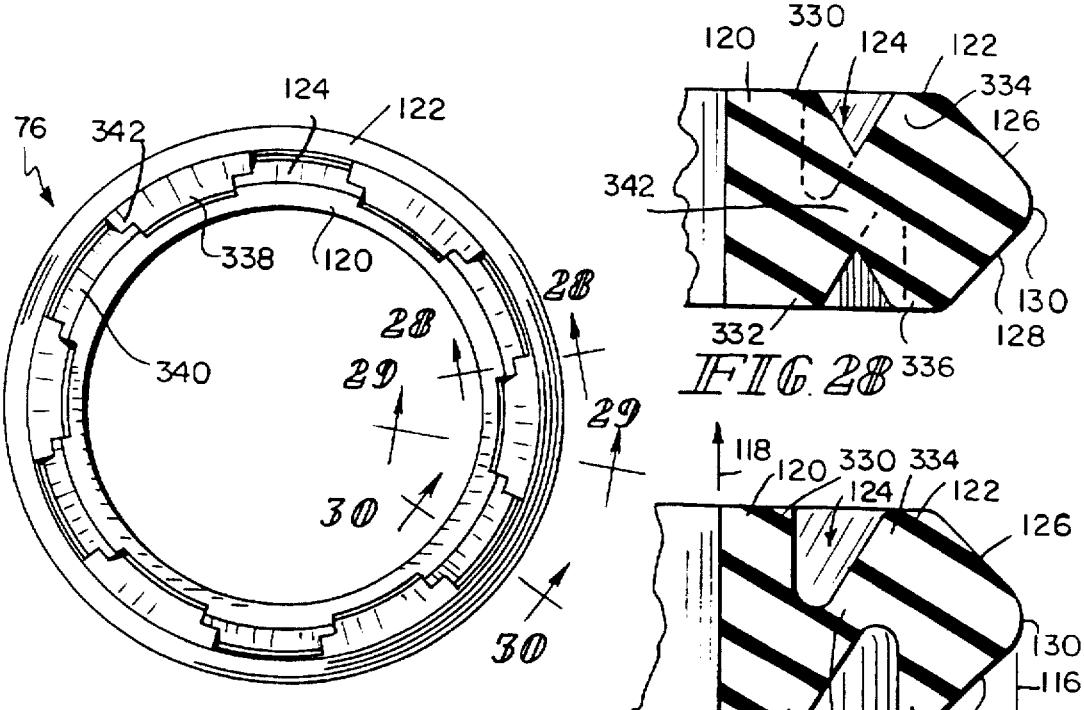
FIG. 27
FIG. 28
FIG. 29
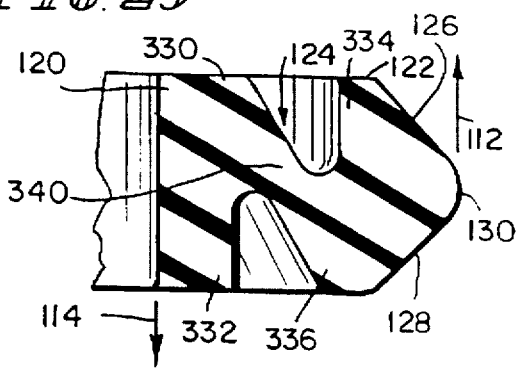
FIG. 30

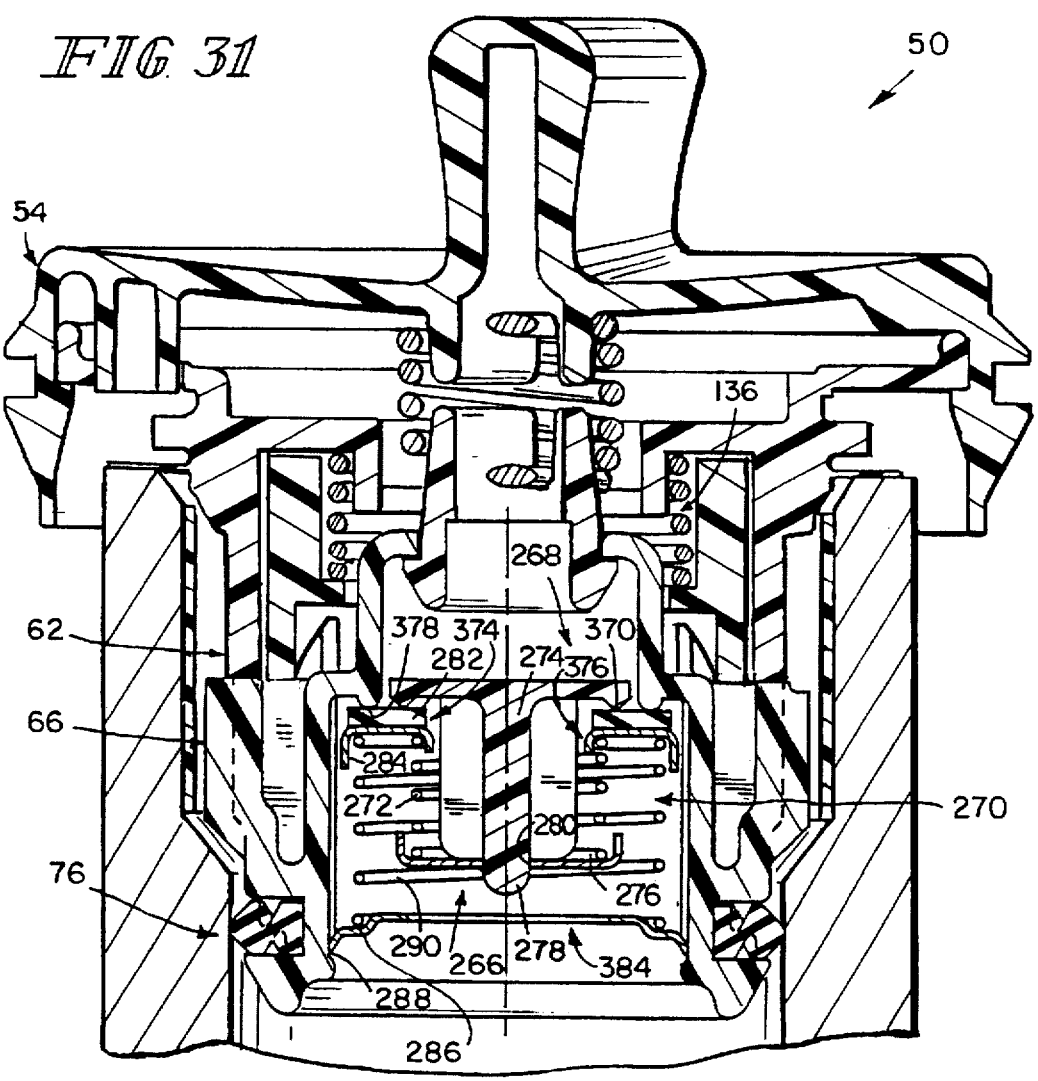

QUICK-ON FUEL CAP

This is a continuation-in-part of U.S. patent application Ser. No. 08/239,217, filed May 6, 1994, now U.S. Pat. No. 5,480,055, issued Jan. 2, 1996.

BACKGROUND AND SUMMARY OF THE INVENTION

The present invention relates to a cap for closing the mouth of a filler neck, and in particular, to a quick-on fuel cap for closing the filler neck of a vehicle fuel tank. More particularly, the present invention relates to a cap including an attachment mechanism for enabling a user to attach the cap to the filler neck quickly and easily and establish a sealed connection between the cap and the filler neck.

Conventional fuel caps for closing the filler neck of a vehicle fuel tank typically include a closure member for closing the mouth of the filler neck and a handle for turning the closure member to mount the closure member in the filler neck. Partial-turn cam-on caps and multiple-turn threaded caps are well-known types of caps for use in closing filler necks. Although such caps are currently in widespread use, it would be desirable to provide an alternative cap that is simpler to install on and remove from a filler neck.

It is known to provide a cam-on cap of the type having a shank portion which extends into the filler neck and is provided with pairs of conventional circumferentially spaced-apart cam lugs as disclosed in U.S. Pat. No. 4,887,733 to Harris. These cam lugs operate in the customary way to engage a filler neck configured to receive a cam-on cap and retain the cap in a fully tightened position closing the open mouth of the filler neck.

Alternatively, a conventional multiple-turn cap includes a closure member that is threaded to be screwed into a threaded filler neck. For example, U.S. Pat. No. 3,820,680 to Friend discloses a multiple-turn threaded cap and a compatible threaded filler neck. Typically, a multiple-turn threaded cap must be turned at least two and one-half or three full revolutions by the user after it is inserted into the threaded filler neck to connect the cap to the filler neck and establish a liquid and vapor seal between the cap and the filler neck.

More and more vehicle drivers are using the self-service bays at gasoline stations and filling their own fuel tanks. Some people have found that it is difficult to remove and install a conventional filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

It is known to provide a filler neck cap for which it is only necessary for the user to move the handle cover of the cap a small amount relative to the filler neck to tighten or loosen the cap during refueling. See, for example, U.S. Pat. Nos. 5,381,919 and 5,395,004 to Griffin et al. Typically these caps include a partial turn-to-remove feature which allows the user to slide the cap out of the filler neck easily rather than requiring the user to turn the entire cap in the filler neck one or more revolutions.

One problem with many conventional filler neck caps is that, because the handle is directly connected to the filler neck closure, any unintentional movement of the handle in the cap-removal direction will break the seal between the closure and the filler neck. Once the seal between the closure and the filler neck is broken, it is possible for fuel or fuel vapor to escape from the filler neck. In some instances, such as during a vehicle accident, a release of fuel or fuel vapor can potentially create a hazardous condition.

It is known to provide a filler neck cap having a lost-motion driving connection between the handle and the closure. See, for example, U.S. Pat. No. 4,765,505 to Harris and U.S. Pat. No. 5,520,300 to Griffin. These caps are designed to allow the cap handle to rotate freely relative to the closure in both the cap-installation direction and the cap-removal direction.

In some cases, a user might be inconvenienced by a cap that provides a lost-motion driving connection during cap installation as well as during cap removal. It is known to provide a filler neck cap having a lost-motion driving connection between the handle and the closure during cap removal and that is automatically set to have a direct-drive driving connection between the handle and closure during cap installation. See, for example, U.S. Pat. No. 5,480,055 to Harris and Griffin.

Filler neck caps that include a sealing mechanism for establishing a liquid fuel and vapor seal between the filler neck and the sealing mechanism are often configured to ensure that the seal remains intact in the event of trauma such as an impact that might result if the vehicle is involved in a collision. See, for example, U.S. Pat. No. 4,678,097 to Crute disclosing a fuel cap including a flange having a frangible section that allows the handle shell to separate from the closure and sealing ring so that the seal remains intact in the event of such an impact. See also U.S. Pat. No. 5,381,919 to Griffin et al. disclosing a seal ring positioned at an axially inner surface on the closure engaging an axially outwardly-facing sealing surface of the filler neck so that the seal is axially compressed therebetween forming the seal at a position axially within the filler neck.

What is needed is a fuel cap providing a quick-on installation and removal mechanism allowing the user to move the handle a minimum angular distance to tighten or loosen the cap during refueling while providing a lost-motion connection between the handle and the closure that is automatically reset upon removal of the fuel cap from the filler neck to automatically provide a direct-drive driving connection between the handle and the closure during cap installation. In addition, the cap should include a sealing gasket positioned axially inwardly past the mouth of the filler neck when the cap is installed to minimize the disruption of the sealing gasket in the event of a vehicle collision.

The cap should be additionally configured to minimize the wear of the gasket over an extended period of use including repeated installations and removals of the cap from the filler neck. Users will appreciate a cap having a compressible gasket that cooperates with the cap and the filler neck to resist wear of the gasket. Users will also appreciate such a cap that provides a tactile indication of the closure of the filler neck, while both users and vehicle manufacturers will appreciate a dust shield integral with the cap that minimizes the contamination of the fuel in the fuel tank by blocking the ingress of particulate debris into the filler neck.

According to the present invention, a cap is provided that is engageable with a filler neck of a vehicle fuel tank. The cap includes a closure for closing the filler neck and a handle connected to the closure for moving the closure relative to the filler neck. The quick-on cap can also include control means for initially providing a lost-motion driving connection during cap removal and always providing a direct-drive driving connection during cap installation. The lost-motion driving connection is established temporarily between the handle and the closure during initial rotation of the handle about an axis of rotation relative to the filler neck in a cap-removal direction. The direct-drive driving connection is always established between the handle and the closure during rotation of the handle about the axis of rotation in a cap-installation direction.

Each time the quick-on cap is removed from a filler neck, it instantly and automatically "resets" itself so that a direct-drive driving connection between the handle and the closure is established to facilitate reinstallation of the quick-on cap on the filler neck. This reset function is achieved by automatic operation of a torsion spring provided between the closure and the handle to rotate the closure relative to the handle. An annular gasket is carried by the closure for sealingly engaging the closure and the filler neck to form a seal therebetween. The seal blocks the escape of liquid fuel and fuel vapor from the filler neck. The gasket includes a radially outer surface engaging the filler neck and a radially inner surface engaging the closure so that the gasket is compressed radially between the closure and the filler neck to sealingly engage both of the filler neck and the closure forming the seal therebetween.

During cap installation, the user always turns the closure in the filler neck in a cap-installation or cap-advancing direction directly by turning the handle about its axis of rotation. The cap is called a "quick-on" cap because a user need only turn the handle one-quarter of a turn (90°) in a clockwise direction once the cap is inserted into the filler neck to anchor the cap in a sealed filler neck-closing position. During cap removal, the user turns the closure in the filler neck in an opposite cap-removal direction.

The closure includes an axially outer upper housing and an axially inner lower housing coupled to the upper housing for rotation with respect thereto. The handle is connected to the upper housing and the sealing gasket is carried by the lower housing so that rotation of the handle does not necessarily result in rotation of the sealing gasket. This allows the sealing gasket to slidingly engage the filler neck as the closure moves axially into the filler neck without rotation of the sealing gasket during cap installation to minimize abrasion of the sealing gasket.

In preferred embodiments, the cap is anchored to the filler neck by retaining means and the retaining means is positioned to lie between the handle and the gasket. This arrangement allows the gasket to be placed axially inwardly a predetermined distance into the filler neck and away from the mouth of the filler neck to minimize the disruption of the seal that might occur in the event of a vehicle collision or undesirable impact to a portion of the vehicle adjacent to the filler neck.

The closure typically includes a cylindrical side wall and the sealing gasket includes an annular hoop-shaped base that sealingly engages the cylindrical side wall of the closure. The gasket also includes an annular outer seal positioned radially outside of the base so that outer portion encircles the base and sealingly engages the filler neck. As the cap is installed into the filler neck, the gasket is radially compressed between the filler neck and the closure to form the seal therebetween to prevent liquid fuel and fuel vapor from escaping the filler neck.

The filler neck in such a closure system includes a cylindrical side wall defining the filler neck mouth and filler neck opening that receives the cap. The cylindrical side wall of the filler neck is formed to include radially inwardly extending helical ramps that cooperate with radially outwardly extending helical ramps formed on the cylindrical side wall of the closure to draw the closure into the filler neck, to draw the sealing gasket into sealing engagement with the filler neck and the closure, to retain the cap in the filler neck, and to retain the sealing gasket in its installed position after installation of the cap.

The cylindrical side wall of the closure includes an axially inner end adjacent to the sealing gasket and an axially outer end coupled to the handle. The helical ramps of the closure are positioned to lie axially between the axially inner and outer ends. Thus, as mentioned above, the sealing gasket is positioned to lie axially inwardly of the retaining means to minimize exposure of the sealing gasket to perturbations that might disrupt the seal formed thereby between the closure and the filler neck.

As the cap is installed into the filler neck, the lower housing slides axially inwardly into the filler neck. The sealing gasket has the hoop-shaped base engaging the cylindrical side wall of the lower housing and additionally has the annular outer seal engaging the filler neck. As can be seen, during the installation of the cap in the filler neck and from the frame of reference of the sealing gasket, as the closure moves axially into the filler neck and the outer seal frictionally engages the filler neck, the hoop-shaped base will be subjected to axially inwardly directed shear forces while the outer seal is subjected to axially outwardly directed shear forces.

With conventional o-ring sealing gaskets these opposing forces would operate to roll the outer seal axially outwardly relative to the hoop-shaped base, much like "rolling" a rubber band along the length of a rolled-up newspaper. The sealing gasket in accordance with the present invention, however, includes a multi-directional connecting membrane connecting the hoop-shaped base to the outer seal that resists these forces. The connecting membrane includes a circumferentially extending inclined first portion that also extends generally axially from the axially inner edge of the hoop-shaped base to the axially outer edge of the outer seal to prevent axially outward rolling movement of the outer seal relative to the hoop-shaped base.

As can be seen, the sealing gasket is also subjected to shear forces during removal of the cap from the filler neck, these removal shear forces acting in the opposite directions of the shear forces encountered during cap installation. During removal of the cap, from the frame of reference of the sealing gasket, the hoop-shaped base is subjected to axially outwardly directed shear forces and the outer seal is subjected to axially inwardly directed shear-forces. The multi-directional connecting membrane can also include a circumferentially extending inclined second portion that also extends generally axially from the axially outer edge of the hoop-shaped base to the axially inner edge of the outer seal to prevent axially inward rolling movement of the outer seal relative to the hoop-shaped base.

In preferred embodiments, the connecting membrane includes a plurality of spaced apart inclined first portions sloping in one direction and a plurality of spaced apart inclined second portions sloping in another direction. The inclined first and second portions are arranged in a circumferentially extending alternating pattern to prevent rolling movement of the outer seal relative to the hoop-shaped base during both installation and removal of the cap to and from the filler neck.

Users that are accustomed to conventional fuel caps requiring rotation of the entire cap in the filler neck one or more revolutions may feel uneasy about whether the installation is complete when only one-quarter of a turn or less is required to complete installation. This may particularly be troublesome for the user when the later stage of the installation is spring-assisted so that the torque applied to install the cap remains constant or decreases instead of increasing as installation is completed, as found on many conventional fuel caps.

The closure includes a spring-loaded intermediate housing engaging the upper and lower housings. The intermediate housing cooperates with the upper and lower housings to provide an "over-center" feel to the cap during cap installation. Rotation of the handle in the cap-advancing direction during cap installation operates to move the upper and lower housings axially into the filler neck. In addition, during a first stage of the cap installation, rotation of the handle in the cap-advancing direction loads a power spring of the intermediate housing so that the power spring biases the handle in the cap-removal direction. This causes the torque applied by the user during rotation of the cap in the cap-advancing direction to increase until a maximum torque is reached.

Once the maximum torque is reached, continued rotation of the handle in the cap-advancing direction during a second stage of the cap installation allows the intermediate housing and the power spring suddenly to bias the handle in the cap-advancing direction assisting the rotation of the handle and the installation of the cap. This "crossover" bias provides the over-center feel that provides an indication to the user that the cap is installed properly. In addition, engagement of the intermediate housing with the lower housing at the end of the installation of the cap results in a "snap" providing the user with a tactile and audible indication that installation is complete.

Also in preferred embodiments, the cap is provided with a dust shield for minimizing the ingress of debris into the filler neck to minimize particulate contamination of the fuel in the fuel tank. Advantageously, the dust shield in accordance with the present invention is an annular dust shield integrally appended to the cylindrical side wall of the closure. The dust shield extends radially outwardly from the side wall and slightly axially inwardly before installation of the cap. After installation, the dust shield engages a border around the mouth of the filler neck and is flexed to a position generally perpendicular to the cylindrical side wall to ensure a tight particulate seal is formed between the dust shield and the mouth of the filler neck.

The value of providing a cap for use on a vehicle fuel tank with a tank pressure control mechanism has been generally recognized in the prior art. However, increasingly aggressive government emission standards, such as recent standards requiring vacuum relief at low pressure differentials with increased air flow during vacuum relief conditions have caused some older mechanisms to become obsolete. The cap in accordance with the present invention is provided with a pressure control mechanism meeting such emission standards.

Venting control mechanisms generally include a pressure-relief valve for relieving vehicle fuel tank pressure when the pressure exceeds a predetermined maximum pressure as well as a vacuum-relief valve for relieving the tank pressure when the tank pressure drops below a predetermined minimum pressure. The pressure-relief and vacuum-relief valves each include, respectively, a pressure-relief face that is acted upon by fuel vapor to cause the pressure-relief valve to move to relieve high tank pressure and a vacuum-relief face that is acted upon by negative tank pressure to cause the vacuum-relief valve to move to relieve low tank pressure.

The tank pressure control mechanism according to the present invention includes a vacuum-relief mechanism in which the vacuum-relief face and the pressure relief valve cooperate to define a larger area upon which atmospheric air can act to cause the pressure-relief valve and the vacuum-relief valve to move to relieve low tank pressure. Increasing the area upon which atmospheric air can act increases the sensitivity of the vacuum-relief mechanism so that the vacuum-relief valve can respond to lower pressure differentials between the vehicle fuel tank and the atmosphere. In addition and as a consequence of both the vacuum-relief and pressure-relief valves moving during the vacuum-relief condition, a larger opening is provided for the flow of atmospheric air allowing for a greater flow rate of air into the fuel tank during vacuum relief.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 7 is a sectional view through the quick-on cap and the filler neck of FIG. 6 before the cap is inserted into the filler neck;

FIG. 8 is a view similar to FIG. 7 showing the quick-on cap after the cap is inserted into the filler neck of FIG. 7 but before the handle cover and upper housing are rotated relative to the filler neck by the user;

FIG. 9 is a sectional view taken along line 9—9 of FIG. 8 showing anti-rotation lugs appended to the lower housing and extending radially outwardly and received by slots formed in the filler neck to prevent rotation of the lower housing relative to the filler neck and driven lugs of the intermediate housing being driven by drive walls of the upper housing;

FIG. 13 is a sectional view taken along line 13—13 of FIG. 8 of the cap in the position shown in FIGS. 1 and 8 showing a cylindrical drive pin cantilevered downwardly from the handle cover to engage a driven edge of a C-shaped slot formed in the upper housing to form a direct drive driving connection therewith during cap installation;

FIG. 14 is an elevation view with portions broken away of the cap of FIG. 13 showing a loading member of the lower housing engaging a downwardly-facing first ramp formed along the bottom edge of the intermediate member and engaging a generally vertical first stop adjacent thereto and the power spring in a generally relaxed state engaging the upper housing and the intermediate member;

FIG. 15 is a view similar to FIG. 13 during cap installation after the handle cover and the upper housing have been rotated one-eighth of a turn (45°) in a clockwise cap-advancing direction relative to the filler neck to initiate installation of the quick-on cap into the filler neck;

FIG. 16 is a view similar to FIG. 14 of the cap of FIG. 15 showing the loading member engaging an axially inner tip of the bottom edge of the intermediate housing defining the cross-over point positioned to lie between the first and second downwardly-facing and upwardly extending ramps and the power spring in a generally compressed state yieldably biasing the intermediate housing downwardly away from the upper housing and toward the lower housing and the loading member;

FIG. 17 is a view similar to FIGS. 13 and 15 after the handle cover has been rotated through a direct-drive second installation stage one-quarter of a turn (90°)in the clockwise cap-advancing direction relative to the filler neck to complete installation of the cap into the filler neck;

FIG. 18 is a view similar to FIGS. 14 and 16 of the cap of FIG. 17 showing the loading number engaging the downwardly-facing second ramp and engaging a generally vertical second stop formed adjacent thereto and the power spring in the generally relaxed state engaging the upper housing and the intermediate member;

FIG. 19 is a view similar to FIG. 17 during a "lost-motion" stage of cap removal after the handle cover has been rotated through a 60° lost-motion angle relative to the filler neck and the closure body that is sealed to the filler neck.

FIG. 20 is a view similar to FIGS. 17 and 19 after a "direct-drive" first removal stage after the handle cover and upper housing have been rotated through a 45° direct-drive angle relative to the filler neck;

FIG. 21 is a view similar to FIG. 18 of the cap of FIG. 20 showing the loading member engaging the tip of the intermediate housing and the power spring in the generally compressed state yieldably biasing the intermediate housing toward the loading member;

FIG. 22 is a view similar to FIGS. 17, 19, and 20 after a "direct-drive" second removal stage after the handle cover and upper housing have been rotated through a 90° direct-drive angle relative to the filler neck and indicating by the double dashed arrow that after the cap has been removed from the filler neck, the wound torsion spring instantly unwinds and rotates the closure body through a 60° "snap-back" angle to its original position so that a direct-drive connection between the handle cover and the closure body is reestablished automatically for use whenever the cap is reinstalled in the filler neck;

FIG. 23 is a view similar to FIGS. 18 and 21 of the cap of FIG. 22 showing the loading member engaging the first ramp and the first stop after removal of the quick-on cap from the filler neck and the power spring in the generally relaxed state engaging the upper housing and the intermediate member;

FIG. 26 is a perspective view of the sealing gasket showing the radially inner hoop-shaped base, the radially outer seal, and the multi-directional connecting membrane connecting the base to the outer seal;

FIG. 27 is a top plan view of the sealing gasket of FIG. 26 showing the base, the outer seal, and the multi-directional connecting membrane therebetween, the multi-directional connecting membrane including a plurality of circumferentially extending inclined first portions alternating with a plurality of circumferentially extending inclined second portions;

FIG. 28 is a sectional view taken along line 28—28 of FIG. 27 showing the base, the outer seal, and a transition portion of the multi-directional connecting membrane position to lie circumferentially between inclined first and second portions;

FIG. 29 is a sectional view taken along line 29—29 of FIG. 27 showing the base, the outer seal, and an inclined positively sloping first portion of the multi-directional connecting membrane connecting an axially inner edge of the base to an axially outer edge of the outer seal to minimize axially inward rolling movement of the outer seal relative to the base;

FIG. 30 is a sectional view taken along line 30—30 of FIG. 27 showing the base, the outer seal, and an inclined negatively sloping second portion of the multi-directional connecting membrane connecting an axially outer edge of the base to an axially inner edge of the outer seal to minimize axial outward rolling movement of the outer seal relative to the base;

FIG. 31 is a view similar to FIG. 7 showing the quick-on cap including the tank pressure control assembly in a static condition blocking the flow of liquid fuel and fuel vapor through the quick-on cap;

FIG. 32 is a view similar to FIG. 31 of the tank pressure control assembly showing both the vacuum-relief valve and the pressure-relief valve moved downwardly to the vacuum-relief position allowing the flow of air from outside of the filler neck, through C-shaped openings in the upper housing, through an opening formed in the tank pressure control assembly by the movement of the vacuum-relief and pressure-relief valves, and into the vehicle fuel tank (not shown); and FIG. 33 is a view similar to FIG. 32 showing the pressure-relief value moved upwardly to a pressure-relief position allowing the flow of pressurized fuel vapor from the fuel tank (not shown), through an opening formed in the tank pressure control assembly by the movement of the pressure-relief value, and into the atmosphere.

DETAILED DESCRIPTION OF THE DRAWINGS

Figure 1:
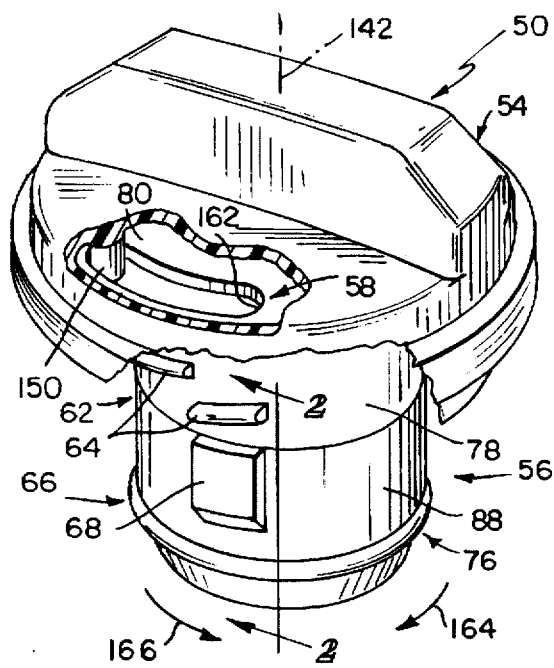
FIG. 1 is a perspective view of a quick-on cap according to the present invention showing the configuration of the cap before it is installed in a filler neck and showing a closure body and an overlying handle cover, with portions broken away, to reveal a cylindrical drive lug appended to the handle and arranged to engage an edge of the closure body defining a C-shaped lost-motion drive slot so that a direct-drive driving connection is established between the handle cover and the filler neck closure.

A quick-on cap 50 in accordance with the present invention can be removed from a compatible filler neck 52 by rotating a handle cover 54 in a counterclockwise cap-removal direction through a 60° lost-motion stage relative to a mounted sealed closure body 56, through a 45° direct-drive first removal stage, past a removal "over-center point", and through a 45° direct-drive second removal stage. Once removed from filler neck 52, a lost-motion mechanism or lost-motion connector 58 of cap 50 automatically resets cap 50 in the manner described below so that a direct-drive driving connection is established between handle cover 54 and closure body 56 during cap installation. Cap 50 is reinstalled into filler neck 52 by inserting closure body 56 of cap 50 back into a mouth 60 of filler neck 52 and rotating handle cover 54 of cap 50 in a clockwise cap-advancing direction through a 45° first installation stage, past an installation "over-center point", and through a 45° second installation stage.

Advantageously, closure body 56 is rotated relative to handle cover 54 automatically after removal of cap 50 from filler neck 52 by lost-motion mechanism 58 so that a lost-motion driving connection is not present and apparent to a user during installation of cap 50 in filler neck 52. Further, this direct-drive driving connection exists before and during cap installation without disrupting a lost-motion driving connection that is established between handle cover 54 and closure body 56 during the lost-motion stage of cap-removal.

A quick-on cap 50 in accordance with the present invention is shown in FIG. 1 as it would appear to a user about to insert cap 50 into a filler neck. Cap 50 includes handle cover 52, a closure body 56 including an upper housing 62 having two outwardly projecting, and axially spaced-apart helical ramps 64, and a lower housing 66 carrying a sealing gasket 76 and having two radially outwardly projecting and circumferentially spaced-apart anti-rotation lugs 68.

Figure 2:
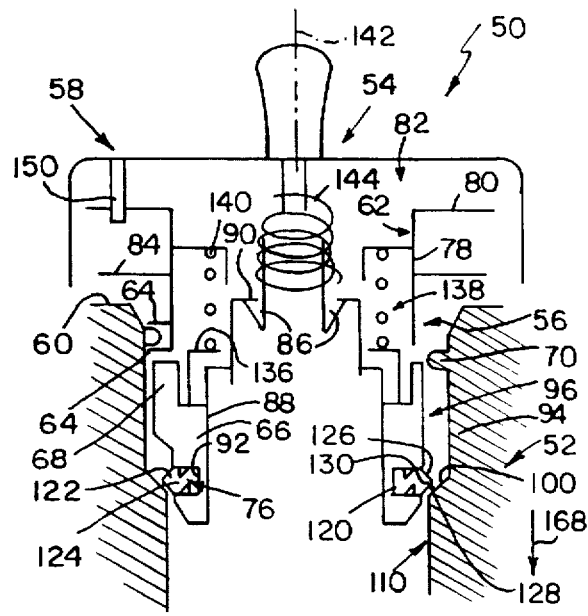
FIG. 2 is a diagrammatic view of the cap of FIG. 1 in an unsealed loosened position just after it has been inserted into a filler neck showing a torsion spring having a top finger coupled to the handle cover, a bottom finger coupled to the closure body, and a coiled portion interconnecting the top and bottom fingers, an annular sealing gasket having a radial outer seal for engaging the filler neck and a housing yieldably biased by a power spring to provide an "over-center" feel during cap installation and cap removal.

Initially, as shown in FIG. 1, ends of ramps 64 are ideally aligned with anti-rotation lugs 68 to permit a user to insert the cap 50 into the filler neck 52 shown diagrammatically in FIG. 2. This filler neck 52 is formed to include radially inwardly extending helical ramps 70 and radially inwardly extending lugs 72 defining stops 74, the ramps 70 and stops 74 defining two circumferentially spaced-apart, axially extending slots 314 (not shown in FIG. 2—see, for example, FIG. 6) for receiving the axially innermost of the helical ramp 64 and anti-rotation lugs 68 during insertion of cap 50 into filler neck 52.

It will be appreciated that helical ramps 70 in filler neck 52 constitute a gripping portion of filler neck 52 disposed axially inwardly from mouth 60 internally in filler neck 52. Although the preferred gripping portion includes helical ramps 70 engaging opposing helical ramps 64 on closure body 56, this gripping portion internally in filler neck 52 may take any number of forms including radially-outwardly extending slots or threads configured to mate with ramps 64 or generally inwardly extending flanges engaging ramps 64. Helical ramps 64 constitute means for engaging such filler neck slots or flanges to prevent axial movement of closure body 56 in filler neck 52.

Essentially, therefore, quick-on cap 50 of the present invention includes means for engaging upper housing 62 to filler neck 52 to permit axial insertion and axial movement of closure body 56 in filler neck 52 during rotation of upper housing 62 within the filler neck 52 as well as means for engaging upper housing 62 with filler neck 52 once handle cover 54 and upper housing 62 are installed following rotation of handle cover 54 and upper housing 62. In a cap-installation direction relative to filler neck 22 to prevent axial outward movement of the cap 50 from filler neck 52. Cap 50 additionally includes means for engaging lower housing 66 carrying sealing gasket 76 to filler neck 52 to permit axial insertion and axial movement of lower housing 66 into filler neck 52 but not rotation of lower housing 66 or sealing gasket 76 in either of the cap-advancing or the cap-removal directions.

Figure 4:
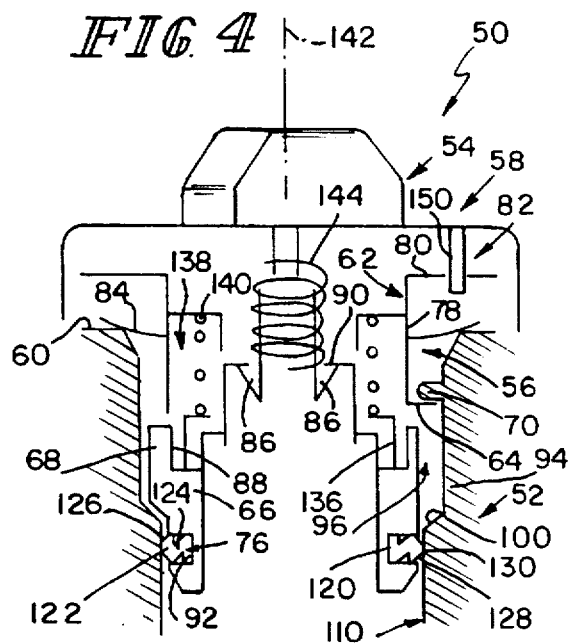
FIG. 4 is a diagrammatic view of the cap of FIG. 3 in place in the filler neck showing radial compression of a sealing ring carried on a cylindrical side wall of the closure body to establish a liquid fuel and fuel vapor seal between the closure body and the filler neck.

As shown diagrammatically in FIGS. 2 and 4, upper housing 62 includes a cylindrical side wall 78 including a radially outwardly extending annular top flange 80 at the outer end 82, radially outwardly extending helical ramps 64, a radially outwardly extending annular dust shield 84, and radially inwardly disposed retaining lugs 86 rotatably connecting upper housing 62 to lower housing 66. Lower housing 66 includes a cylindrical side wall 88 including a radially inwardly extending flange 90 engaging retaining lugs 86. Cylindrical side wall 88 is additionally formed to include an annular channel 92. Sealing gasket 76 is carried by annular channel 92 and extends radially outwardly therefrom.

Sealing gasket 76 includes a radially inward hoop-shaped base 120, a radially outward outer seal 122, and a multi-directional connecting membrane 124 there between as shown diagrammatically in FIGS. 2 and 4. Outer seal 122 of sealing gasket 76 also includes an annular upper ramp 126 and annular lower ramp 128, upper and lower ramps 126, 128 cooperating to define a radially outwardly directed annular tip 130 of sealing gasket 76.

Filler neck 52 includes a filler neck side wall 94 defining a generally cylindrical filler neck opening 96 as shown diagrammatically in FIGS. 2 and 4. Filler neck side wall 94 is formed to include an axially outer end defining mouth 60, helical ramps 70, annular axial ramp 100 extending radially inwardly as axial ramp 100 extends axially inwardly, and a cylindrical sealing surface 110 positioned to lie axially inwardly from axial ramp 100 as shown diagrammatically in FIGS. 2 and 4. As can be seen, as cap 50 is installed into filler neck 52 and lower housing 66 moves axially inwardly, lower ramp 126 of sealing gasket 76 engages axial ramp 200 of filler neck 52 as shown diagrammatically in FIG. 2. Upon continued axially inward movement of lower housing 66, lower ramp 128 and axial ramp 100 cooperate to radially compress sealing gasket 76. Once installation of cap 50 is complete, tip 130 of sealing gasket 76 engages sealing surface 110 of filler neck 52 as shown diagrammatically in FIG. 4 to sealingly engage filler neck 52 and form a seal between lower housing 66 and filler neck 52 preventing the egress of liquid fuel and fuel vapor from the vehicle fuel tank (not shown) through filer neck 52.

Advantageously, lower housing 66 is also formed to include anti-rotation lugs 68 as shown diagrammatically in FIGS. 2 that cooperate with stops 74 (not shown in FIGS. 2 and 4, see, for example, FIG. 6) to prevent rotation of lower housing 66 as cap 50 is installed in filler neck 52. Thus, as cap 50 is installed in filler neck 52, sealing gasket 76 engages filler neck side wall 94 and slides axially with respect thereto but without rotating with respect therefore to minimize abrasion or other damage to sealing gasket 76.

As shown diagrammatically in FIG. 4, once cap 50 is installed, helical ramps 64 of upper housing 62 retain cap 50 in filler neck 52. Sealing gasket 76 is positioned to lie axially inwardly of helical ramps 64 and is radially compressed between lower housing 66 and filler neck 52 to form the seal there between. By forming the seal at an axially inward position inside of filler neck 52, the risk of disrupting the seal, even during an event such as a vehicle collision, is minimized.

As also shown diagrammatically in FIG. 4, annular dust shield 84 engages mouth 60 of filler neck 52 when cap 50 is installed. Dust shield 84 is radially cantilevered on cylindrical side wall 78 and is biased axially inwardly to ensure that a seal is formed between dust shield 84 and mouth 98 preventing the ingress of particulates into filler neck 52.

As shown diagrammatically in FIGS. 2 and 4, cap 50 also includes an intermediate housing 136 received in a hollow interior 138 of closure body 56 defined by upper and lower housings 62, 66. A power spring 140 engages upper housing 62 and intermediate housing 136 to yieldably bias intermediate housing 136 axially inwardly away from upper housing 62 and toward lower housing 66. Power spring 140 and intermediate housing 136 cooperate with upper and lower housings 62, 66 to provide an "over-center feel" during the installation and removal of cap 50 to and from filler neck 52. In addition, power spring 140 and intermediate housing 136 cooperate with upper and lower housings 62, 66 to provide both tactile and audible indications of complete installation of cap 50 so that during installation the user perceives a significant reduction in the required applied torque and upon complete installation the user perceives a tactile vibration and an audible "snap" indicating that installation of cap 50 into filler neck 52 is complete.

Figure 3:
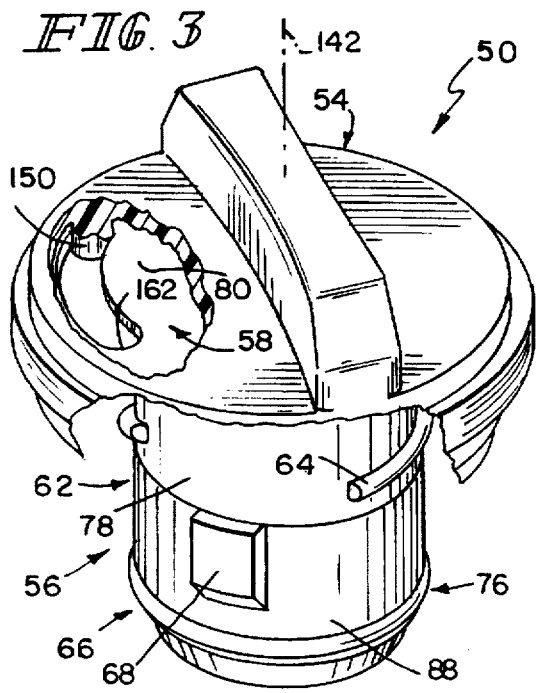
FIG. 3 is a perspective view of the cap of FIG. 1 as it would appear in the filler neck during cap installation after the handle cover has been rotated one-quarter of a turn (90°) in a cap-advancing direction relative to the filler neck using the direct-drive driving connection and after helical ramps on an upper housing of the closure body have been rotated into engagement with mating helical ramps in the filler neck to anchor the closure body in the filler neck and radially trap a sealing gasket between the closure body and the filler neck.

Lost-motion mechanism 58 includes a pair of cylindrical downwardly-extending appendages or drive lugs 150 appended to the underside of handle cover 54 and extending downwardly therefrom as shown in FIGS. 1 and 3 and as shown diagrammatically in FIGS. 2 and 4. Top flange 80 includes an edge 152 defining a C-shaped slot 154 receiving drive lug 150. Lost-motion mechanism 58 also includes edge 152 that defines C-shaped slot 154 as shown in FIGS. 1 and 5; and A top spring mount 156 is also appended to the underside of handle cover 54 and torsion spring 144 is positioned inside cap 50 to interconnect top spring mount 156 on handle cover 54 and a bottom spring mount 158 on upper housing 62.

Although illustrative and preferred cap 50 includes two drive lugs 150, the operation of each drive lug 150 is substantially similar and the operation of cap 50 will be described below with reference to only one of the above-noted drive lugs 150 with the understanding that the other of the drive lugs 150 operates in substantially the same manner. It should be noted that even though the illustrative and preferred embodiment includes two drive lugs 150, cap 50 can include any reasonable number of drive lugs 150 without exceeding the scope of the invention as presently perceived.

As shown diagrammatically in FIGS. 2 and 4, upper housing 62 is coupled to handle cover 54 by coupling means (described in detail below) so that upper housing 62 will rotate about its axis 142 in response to manual rotation of handle cover 54 about axis 142 during installation and removal of filler neck cap 50. It will become clear that a direct-drive driving connection between handle cover 54 and upper housing 62 is always established during cap installation. A torsion spring 44 is provided inside cap 50 for urging the upper housing 62 and handle cover 54 in the same direction so that lost-motion mechanism 58 resets after removal of cap 50 from filler neck 52 as described below.

Figure 5:
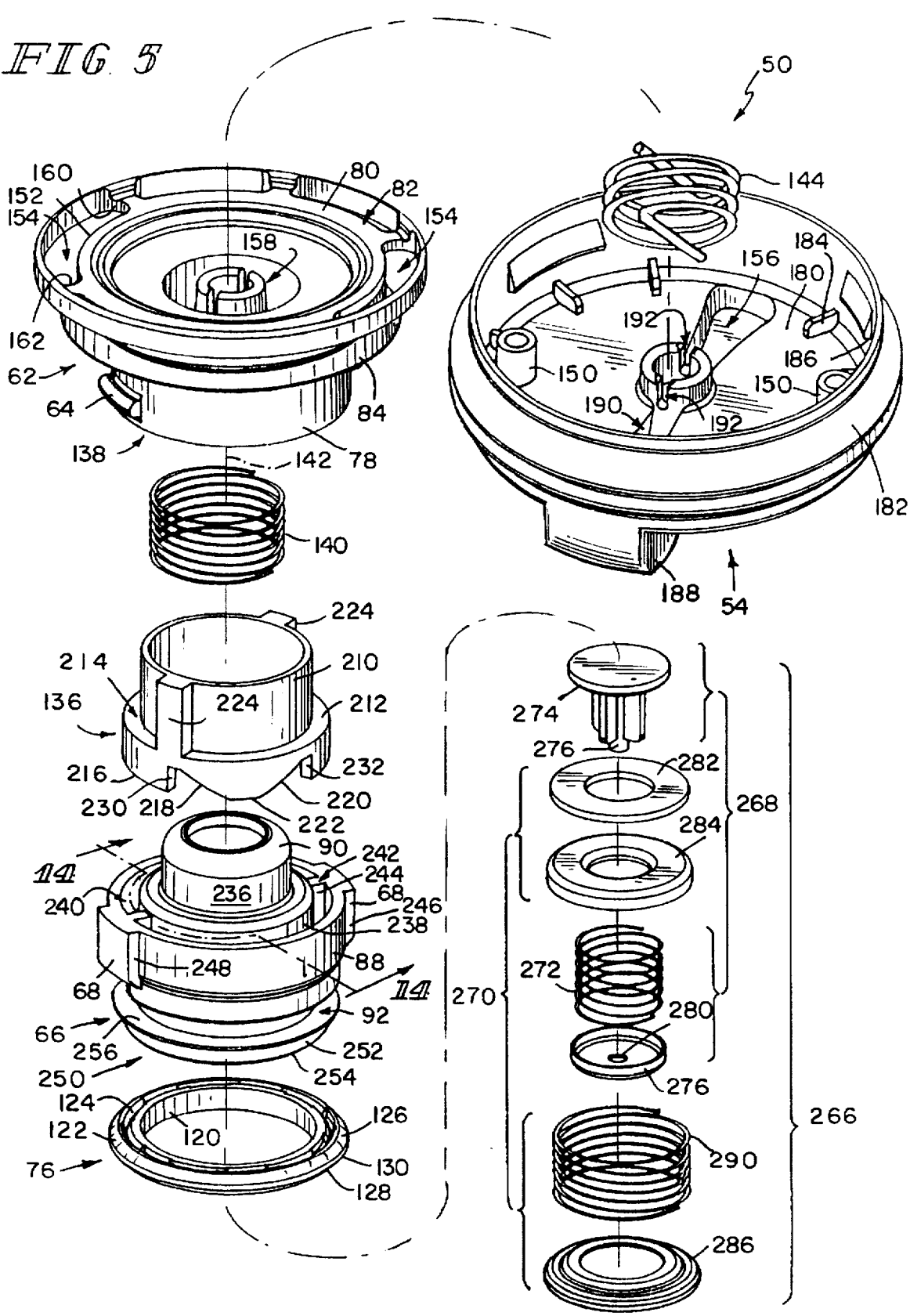
FIG. 5 is an exploded perspective view of a preferred embodiment of the quick-on cap of FIG. 1 showing a handle cover including first slots receiving a first finger or end of a torsion spring, an upper part of the closure body including second slots receiving a second finger or end of the torsion spring, a power spring and an intermediate housing received in an interior region of the closure body, the interior region of the closure body being defined by the upper housing and a lower housing rotatably connected to the upper housing, and various components of a tank pressure control assembly received by the lower housing including a pressure-relief valve subassembly and a vacuum-relief valve subassembly.

Edge 152 of C-shaped slot 154 includes a first driven edge 160 and a second driven edge 162 as shown in FIGS. 1, 3, and 5. Drive lug 150 provides installation-drive means for engaging first driven edge 160 during rotation of handle cover 54 about axis of rotation 142 in the cap-advancing direction to rotate upper housing 62 in a clockwise installation direction in filler neck 52 as shown, for example, in FIGS. 1–4, 13,15, and 17. Drive lug 150 also provides removal-drive means for engaging second driven edge 162 at a predetermined point during rotation of handle cover 54 about axis of rotation 142 in the cap-removal direction to rotate upper housing 62 in a counterclockwise removal direction in filler neck 52 as shown, for example, in FIGS. 19, 20, and 22.

It will become clear as this description progresses that the spacing between first and second driven edges 160, 162 of C-shaped slot 154 controls the amount of "lost-motion" generated in cap 50 during a lost-motion stage of cap removal before a direct-drive driving connection is established during direct-drive stages of cap removal. In addition, torsion spring 144 functions to turn upper housing 62 relative to handle cover 54 each time cap 50 is removed from filler neck 52 to "reset" lost-motion mechanism 58 of cap 50 automatically so that a direct-drive relationship between handle cover 54 and upper housing 62 is established before and during each cap-installation activity.

In use, quick-on cap 50 is easily installed on filler neck 20 to establish a fuel vapor seal between the cap 50 and filler neck 52 by taking cap 50 shown in FIG. 1, inserting it axially into the filler neck 52 as shown diagrammatically in FIG. 2 so that uppermost helical ramp 64 of upper housing 62 engages helical ramps 70 of filler neck 52, and then rotating handle cover 54 one-quarter of a revolution (90°) about axis 142 in a clockwise or cap-advancing direction 164. Such rotation of handle cover 54 rotates upper housing 62 relative to lower housing 66 to advance lower housing 66 and sealing gasket 76 axially into engagement with sealing surface 110 of filler neck 52 to radially compress sealing gasket 76 between filler neck 52 and lower housing 66 and establish a fuel vapor seal. Anti-rotation lugs 68 on lower housing 66 engage other internal lugs 72 (shown in FIGS. 6 and 7) in filler neck 52 to block rotation of lower housing 66 and sealing gasket 76 relative to filler neck 52 during rotation of handle cover 54 and upper housing 62 relative to filler neck 52 to minimize abrasion of sealing gasket 76.

At the same time, rotation of upper housing 62 about axis 142 rotates helical ramps 64 of upper housing 62 relative to engaged helical ramps 70 of filler neck 52 to move upper and lower housings 62, 66 from the position shown in FIG. 2 further into the filler neck 52 in axially inward direction 168 to the position shown in FIG. 4. This inward movement of upper housing 62 causes dust shield 84 to engage and flex against mouth 60 of filler neck 52. Meanwhile, helical ramps 64 of upper housing 62 grip helical ramps 70 of filler neck 52 to retain cap 50 in filler neck 52. Reference is hereby made to Griffin and Harris U.S. Pat. No. 5,395,004 and U.S. patent application Ser. No. 08/239,217 entitled "Quick-on Cap with Removal Delay Mechanism", which are incorporated by reference herein, for detailed descriptions of the means and manner for mounting cap 50 on a filler neck.

Cap 50 is easily removed from filler neck 52 during refueling by rotating handle cover 54 about axis of rotation 142 through the "lost-motion" stage and then through first and second "direct-drive" stages. This three-stage operation is shown in FIGS. 12 and 19-23.

First, cap 50 is twisted one-sixth of a revolution (60°) through a lost-motion angle 170 (shown in FIG. 22) in a counterclockwise or cap-removal direction 166 from the position shown in FIG. 3 to the position shown in FIG. 19. It will be understood that this is called a lost-motion stage because the user is able to rotate handle cover 12 through a 60° angle without turning upper or lower housings 62, 66 in filler neck 52 because drive lug 150 moves relative to its companion C-shaped slot 154 of upper housing 62. Essentially, drive lug 150 engages first driven edge 160 of slot 154 at the start of this lost-motion stage, engages the elongated edge 152 of slot 154 during lost-motion rotation of handle cover 54 in cap-removal direction 166, and engages second driven edge 162 of slot 154 at the end of this lost-motion stage (and the start of the first direct-drive stage).

Second, cap 50 is rotated one-eighth of a revolution (45°) through a first direct-drive angle 172 in cap-removal direction 166 from the position shown in FIG. 19 to the position shown in FIG. 20. It will be understood that this is called a direct-drive stage because upper housing 62 turns in filler neck 52 about axis of rotation 142 directly in response to rotation of handle cover 52 through a 45° angle. Finally, cap 50 is rotated one-eighth of a revolution (45°) through a second direct-drive angle 174 in cap-removal direction 166 from the position shown in FIG. 20 to the position shown in FIG. 22. It will also be understood that this is also called a direct-drive stage because upper housing 62 turns in filler neck 52 about axis of rotation 142 directly in response to rotation of handle cover 52 through a 45° angle.

The cap 50 is now in a position where it can be withdrawn easily from mouth 60 of filler neck 52. Once cap 50 is withdrawn, the wound torsion spring 144 "unwinds" and rotates upper and lower housings 62, 66 of closure body 56 relative to handle cover 54. This snap-back action resets lost-motion mechanism 58 of cap 50 from the configuration shown in FIG. 22 to the configuration shown in FIG. 1. Essentially, closure body 56 rotates about axis of rotation 142 so that cylindrical drive lug 150 now engages the first driven edge 160 of C-shaped slot 154 as shown in FIG. 1 to establish a direct-drive connection that functions during cap installation.

An exploded perspective view of the quick-on cap 50 of FIGS. 1 and 3 is provided in FIG. 5 to illustrate a preferred embodiment of the various components in the cap 50. Handle cover 54 includes a circular top wall 180, annular perimeter side wall 182, a plurality of radially inwardly projecting lugs 184, a plurality of radially inwardly projecting ledges 186, and a hollow grip handle 188 formed to include an elongated axially inwardly opening channel 190 extending across the diameter of the circular top wall 180. Handle cover 54 is used in the manner described below to rotate upper housing 62 inside lower housing 66 because of a coupling between handle cover 54 and upper housing 62. First and second drive lugs 150 are appended to top wall 180 and are cantilevered downwardly therefrom.

Upper housing 62 is preferably formed as illustrated in FIG. 5 so that the axially extending cylindrical side wall 78 defines a cylindrical inner chamber 138 for receiving an assembly including power spring 140 and intermediate housing 136 therein. Cylindrical side wall 78 also includes helical ramps 64 formed to lie in spaced-apart relation to one another, as shown best in FIG. 1, about the circumference of side wall 78. As best shown in FIG. 7, upper housing 62 is also provided with an upwardly directed annular ledge 196 disposed beneath bottom spring mount 158 and engaging annular flange 90 of lower housing 66 to rotatably couple upper housing 62 to lower housing 66.

Intermediate housing 136 is preferably formed as illustrated in FIG. 5 to include an axially extending cylindrical side wall 210 that is sized to fit within inner chamber 138 of upper housing 62. A radially outwardly extending flange 212 is appended to an inner end 214 of side wall 210 and an axially inwardly extending annular wall 214 is appended to flange 212. A bottom edge 216 of annular wall 214 defines opposing first and second axial ramps 218, 220 and a tip 222 positioned to lie between ramps 218, 220. Radially outwardly extending driven lugs 224 engage drive walls 226, as shown best in FIG. 7, formed on side wall 78 of upper housing 62 and extending radially inwardly therefrom so that intermediate housing 136 is rotatably fixed with upper housing 62. Flange 212 also extends radially inwardly from inner end 214 of side wall 210 to define a ledge 228 engaging power spring 140 as shown in FIG. 7.

Lower housing 66 is preferably formed as illustrated in FIG. 5 to include an axially outwardly projecting necked-down tubular body 236 that is sized to fit through an interior region of intermediate housing 136 and terminating at inwardly extending flange 90 engaging ledge 196 to rotatably couple lower housing 66 to upper housing 62 as shown in FIG. 7. Lower housing 66 also includes a cylindrical inner wall 238 spaced-apart from cylindrical side wall 88 to form an annular pocket 240 there between and loading members 224 connecting inner wall 238 and wall 88 and having tops 242. The anti-rotation lugs 68 are appended to wall 88 and arranged to lie in spaced-apart relation around the circumference of wall 88. Each anti-rotation lug 68 includes a stop face 246,248 for engaging an internal flange in filler neck 52 to limit rotation of lower housing 66 in filler neck 52 during cap installation and cap removal.

Lower housing 66 is provided with an axially inwardly directed annular apex 250 as shown in FIG. 5 having a ramp 252 tapering radially inwardly toward an axially inner end 254 for engaging filler neck 52 and guiding the movement of cap 50 as cap 50 is inserted into filler neck 52. Cylindrical side wall 88 is also formed to include annular channel 92 adjacent ramp 252, the axially outer edge of ramp 252 being coincident with a radially outer edge of an upwardly-facing annular wall 256 that defines channel 92.

Annular sealing gasket 76 is carried by channel 92 and extends radially outwardly therefrom. Sealing gasket 76 is preferably formed as illustrated in FIG. 5 having hoop-shaped base 120 sealingly engaging lower housing 66, annular outer seal 122 positioned radially outwardly of and spaced apart from base 120, and multi-directional connecting membrane 124 connecting outer seal 122 to base 120. Multi-directional connecting membrane 124 is configured so that sealing gasket 76 is squeezed radially inwardly upon engagement with cylindrical sealing surface 110 of filler neck 52 to form a seal between lower housing 66 and filler neck 52 blocking the flow of liquid fuel and fuel vapor out of filler neck 52.

Tank pressure control assembly 266 shown in FIG. 5 includes a pressure-relief valve subassembly 268 and a vacuum-relief valve subassembly 270 that are mounted in an interior region 258 of lower housing 66, as shown best in FIGS. 31-33, to control the flow of pressurized fuel vapor out of the filler neck 52 and atmospheric air into the filler neck 52. Pressure-relief valve subassembly 268 includes pressure-relief spring 272, annular valve plate 276, and pressure-relief valve 274 including a retaining pin 278 received by an opening 208 in annular valve plate 276 to fix pressure-relief valve 274 to annular valve plate 276. Vacuum-relief valve subassembly 270 includes annular vacuum-relief valve 282, upper annular valve plate 284 attached to vacuum-relief valve 282, lower annular valve plate 286 resting on an upwardly-facing ledge 288 formed adjacent to end 254 of lower housing 66 as shown best in FIG. 31, and vacuum-relief spring 290 yieldably biasing upper and lower plates 284, 286 apart.

Figure 6:
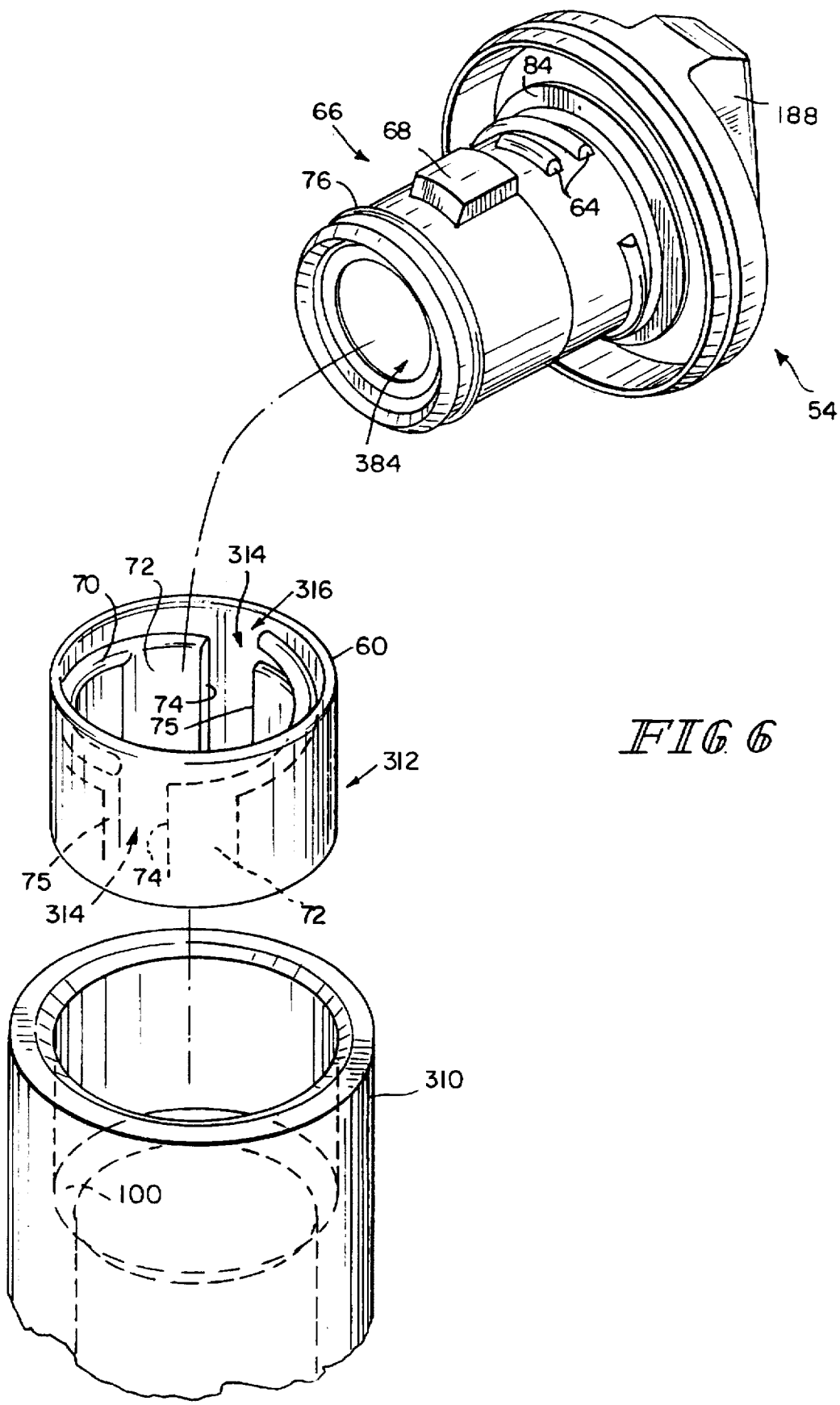
FIG. 6 is a perspective view of the quick-on cap of FIG. 5 as it is about to be inserted into a filler neck provided with various internal mounting ramps.

Filler neck 52 is shown in more detail in FIG. 6. Filler neck 52 illustratively includes a sheet metal fill tube 310 and a molded plastic insert 312 received in fill tube 310. Filler neck side wall 194 is formed to include internal flanges 72 that illustratively define a pair of axially directed slots 314 for receiving and guiding anti-rotation lugs 68 that are appended to lower housing 66. An axially extending slot 314 is provided for receiving each of anti-rotation lugs 68 as quick-on cap 50 is thrust into cap-receiving aperture 316 defined by mouth 60 of insert 312. As cap 50 is inserted into filler neck 52, anti-rotation lugs 68 are rotatably fixed by stops 74 of radially inwardly directed lugs 72 defining axially extending slots 314 to block rotation of lower housing 66 in filler neck 52 without inhibiting rotation of upper housing 62 relative to lower housing 66 and filler neck 52.

Filler neck 52 is provided with helical ramp 70 as illustratively shown in FIG. 7. When the user installs cap 50 into filler neck 52, the user inserts cap 50 into filler neck 52 and moves cap 50 axially inwardly until the outermost of the helical ramps 64 on upper housing 62 engage helical ramps 70 to stop the axial inward movement of cap 50 so that the cap 50 is positioned in filler neck 52 as shown in FIGS. 8 and 9.

The innermost of helical ramps 64 are received by slots 314 formed between ramps 70 of filler neck 52 and lugs 72 as shown best in FIG. 9. If the user then attempts to rotate handle cover 54 in cap-removal direction 166, anti-rotation of lugs 68 of lower housing 66 engage stops 74 of lugs 72 of filler neck 52 to prevent rotation of lower housing 66, loading members 244 of lower housing 66 engage vertical stops 230 of intermediate housing 136 to prevent rotation of intermediate housing 136, and driven lugs 224 of intermediate housing 136 engage drive walls 226 of upper housing 62 to prevent rotation of upper housing 62. Handle cover 54 will rotate through lost-motion angle 170, however once drive lugs 150 of handle cover 54 engage second driven edges 162, handle cover 54 will rotate no further.

If instead the user rotates handle cover 54 in the clockwise cap-advancing direction 164 after inserting cap 50 into filler neck 52 to the position shown in FIGS. 8 and 9, handle cover 54, upper housing 62, and intermediate housing 136 will rotate relative to filler neck 52 and lower housing 66 to initiate the first direct-drive installation stage. Anti-rotation lugs 68 on lower housing 66 engage stops 75 of lugs 74 to prevent the rotation of lower housing 66 relative to filler neck 52.

As handle cover 54, upper housing 62, and intermediate housing 136 rotate in cap-advancing direction 164, innermost of helical ramps 64 engages helical ramps 70 of filler neck 52 to draw cap 50 axially inwardly into filler neck 52. Thus, although rotation of handle cover 54 does not cause rotation of lower housing 66 and sealing gasket 76, rotation of handle cover 54 does drive lower housing 66 and sealing gasket 76 axially inwardly into filler neck 52.

As lower housing 66 moves axially inwardly into filler neck 52, sealing gasket 76 slidingly engages axial ramp 100 of filler neck side wall 94. Continued axially inward advancement of lower housing 66 causes annular lower ramp 128 of sealing gasket 76 to ride along ramp 100, consequently moving outer seal 122 of sealing gasket 76 axially inwardly compressing sealing gasket 76 radially between lower housing 66 of closure body 56 and filler neck side wall 94. Once lower housing 66 has advanced to the installed position shown in FIG. 10 at the end of the first direct-drive installation stage, tip 130 of outer seal 122 of sealing gasket 76 sealingly engages cylindrical sealing surface 110 of filler neck 52 and hoop-shaped base 120 sealingly engages lower body 66 to form a radial seal preventing the flow of liquid fuel and fuel vapor out of filler neck 52.

As can be seen, the seal thus formed is positioned to lie axially inwardly in filler neck 52 in a remote position away from mouth 60 of filler neck 52. In the event of a vehicle collision or other forcible impact that may affect filler neck 52, having the seal positioned axially inwardly will minimize the possibility that the seal will be disrupted.

Figure 10:
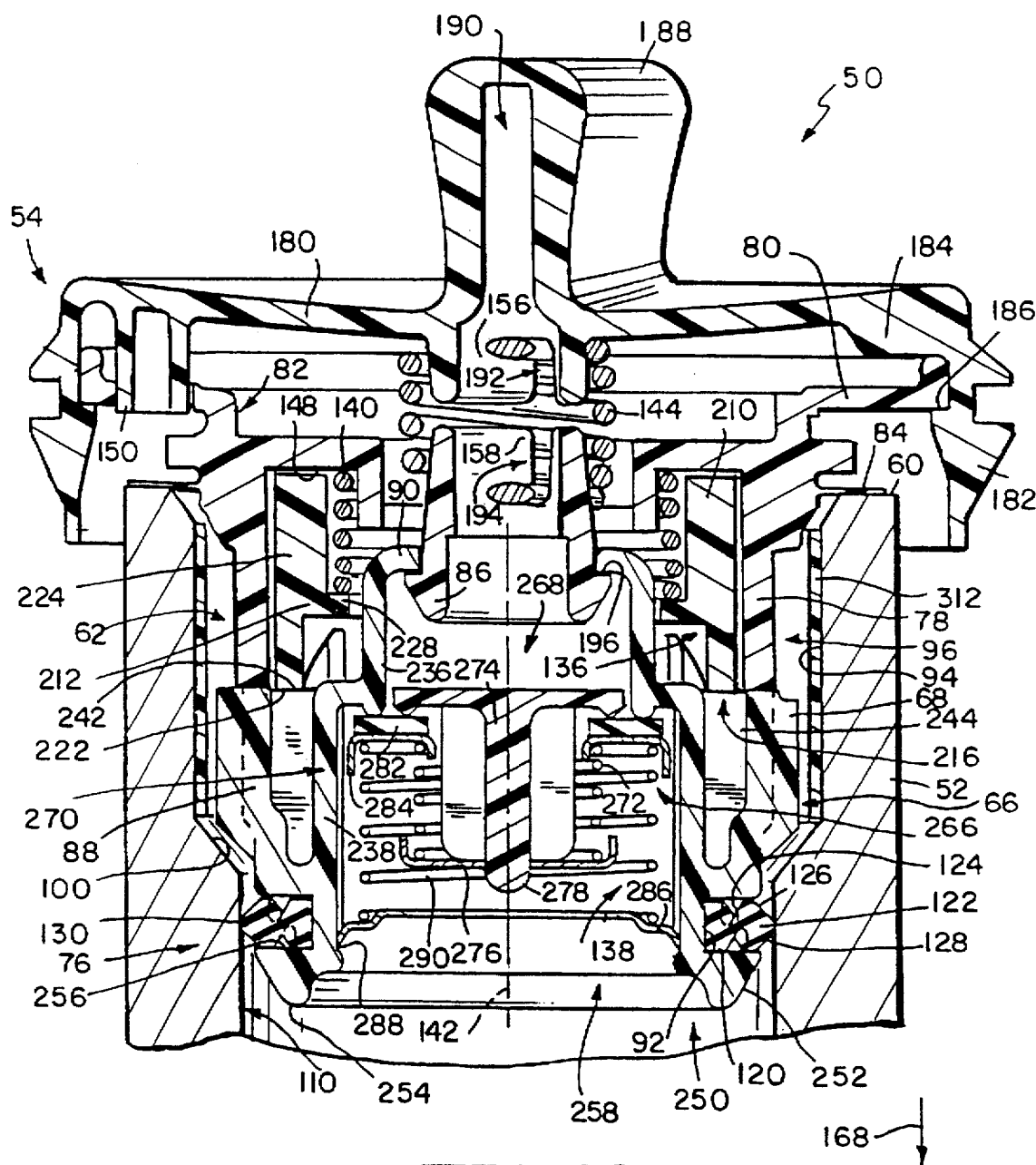
FIG. 10 is a view similar to FIG. 8 after the handle cover is rotated to a "cross-over" point at which the power spring operates to bias the handle cover in the cap-advancing direction showing the power spring compressed and biasing the intermediate housing downwardly toward the lower housing.

After the first installation stage is complete, continued rotation of handle cover 54 completes the second direct-drive installation stage described in more detail with reference to FIGS. 11-25 below. Once installation of cap 50 in filter neck 52 is complete, innermost of helical ramps 64 cooperates with helical ramps 70 of filler neck 52 to retain cap 50 in filler neck 52. Thus, the radial seal formed between lower housing 66 and filler neck 52 is positioned to lie axially inwardly of helical ramps 64 of upper housing 62 and helical ramps 70 of filler neck 52 which cooperate as a retaining mechanism for retaining cap 50 in filler neck 52 as shown in FIG. 10.

To remove cap 50 from filler neck 52, the user rotates handle cover 54 in the counterclockwise cap-removal direction 166. During the lost-motion stage of cap removal, handle cover 54 rotates through lost-motion angle 170 relative to upper housing 62 and drive lug 150 slides along C-shaped slot 154 formed in upper housing 62 as described in more detail below with reference to FIG. 19 so that there is no driving connection between handle cover 54 and upper housing 62. Rotation of handle cover 54 relative to upper housing 68 operates to apply torque to or "wind-up" torsion spring 144, which is fixed to top spring mount 156 of handle cover 54 and bottom spring mount 158 which is fixed to upper housing 62.

Continued rotation of handle cover 54 in cap-removal direction 166 relative to filler neck 52 causes drive lug 150 to engage edge 152 of slot 154 to establish a direct-drive driving connection between handle cover and upper housing 62, initiating the first direct-drive removal stage. Upper housing 62 rotates with handle cover 54 as the result of the engagement of drive lug 150 and edge 152, and drive walls 226 of upper housing engage driven lugs 224 of intermediate housing 136 to cause intermediate housing 136 to rotate with upper housing 62. Anti-rotation lugs 68 of lower housing 66 engage stops 75 of radially inwardly extending lugs 72 of filler neck 52 to prevent rotation of lower housing 66 relative to filler neck 52.

Rotation of handle cover 54 during the first direct-drive removal stage causes outermost helical ramps 64 of upper housing 62 to cooperate with helical ramps 70 of filler neck 52 to start withdrawing cap 50 from filler neck 52. Because anti-rotation lugs 68 cooperate with stops 75 to prevent rotation of lower housing 66, lower housing 66 and sealing gasket move axially outwardly without rotating relative to filler neck 52. At the completion of the first direct-drive removal stage, cap 50 is positioned in filler neck 52 as shown in FIG. 10 with lower housing 66 still positioned in an installed position having not yet moved axially outwardly away from cylindrical sealing surface 110 of filler neck 52.

Continued rotation of handle cover 54 initiates the second direct-drive removal stage. Ramps 64 continue to cooperate with ramps 70 to draw cap 50 out of filler neck 52 and anti-rotation lugs 68 continued to cooperate with stops 75 to prevent rotation of lower housing 66 and sealing gasket 76. At the completion of the second direct-drive removal stage, cap 50 is positioned in filler neck as shown in FIGS. 8 and 9. Note that even after the completion of the second direct-drive removal stage, anti-rotation lugs 68 cooperate with stops 75 to prevent the rotation of lower housing 66 relative to filler neck 52, loading members 244 engage vertical stops 230 to prevent the rotation of intermediate housing 136 relative to filler neck 52, and driven lugs 224 engage drive walls 226 of upper housing 62 to prevent the rotation of upper housing 62 relative to filler neck 52.

When cap 50 is completely disengaged from filler neck 52 and anti-rotation lugs 68 are moved away from stops 75 of filler neck 52, torsion spring 144 causes upper housing 62, intermediate housing 136, and lower housing 66 to rotate relative to handle cover 54 to reset lost-motion mechanism 58 and to return cap 50 to the position shown in FIG. 7. Thus, lost-motion mechanism 58 of cap 50 automatically resets after removal of cap 50 from filler neck 52 so that cap 50 is immediately ready for installation in filler neck 52 after disengagement from filler neck 52 without any additional intervention by the user.

Figure 11:
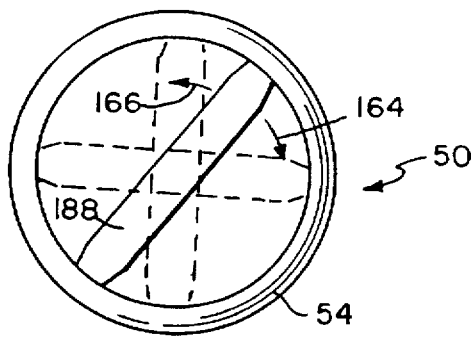
FIG. 11 is a top plan view of the quick-on cap of FIG. 10 showing the handle cover (in phantom) after the cap is inserted into the filler neck but before the handle cover and upper housing are rotated relative to the filler neck and showing the handle cover (in phantom) after cap installation is complete.
Figure 12:
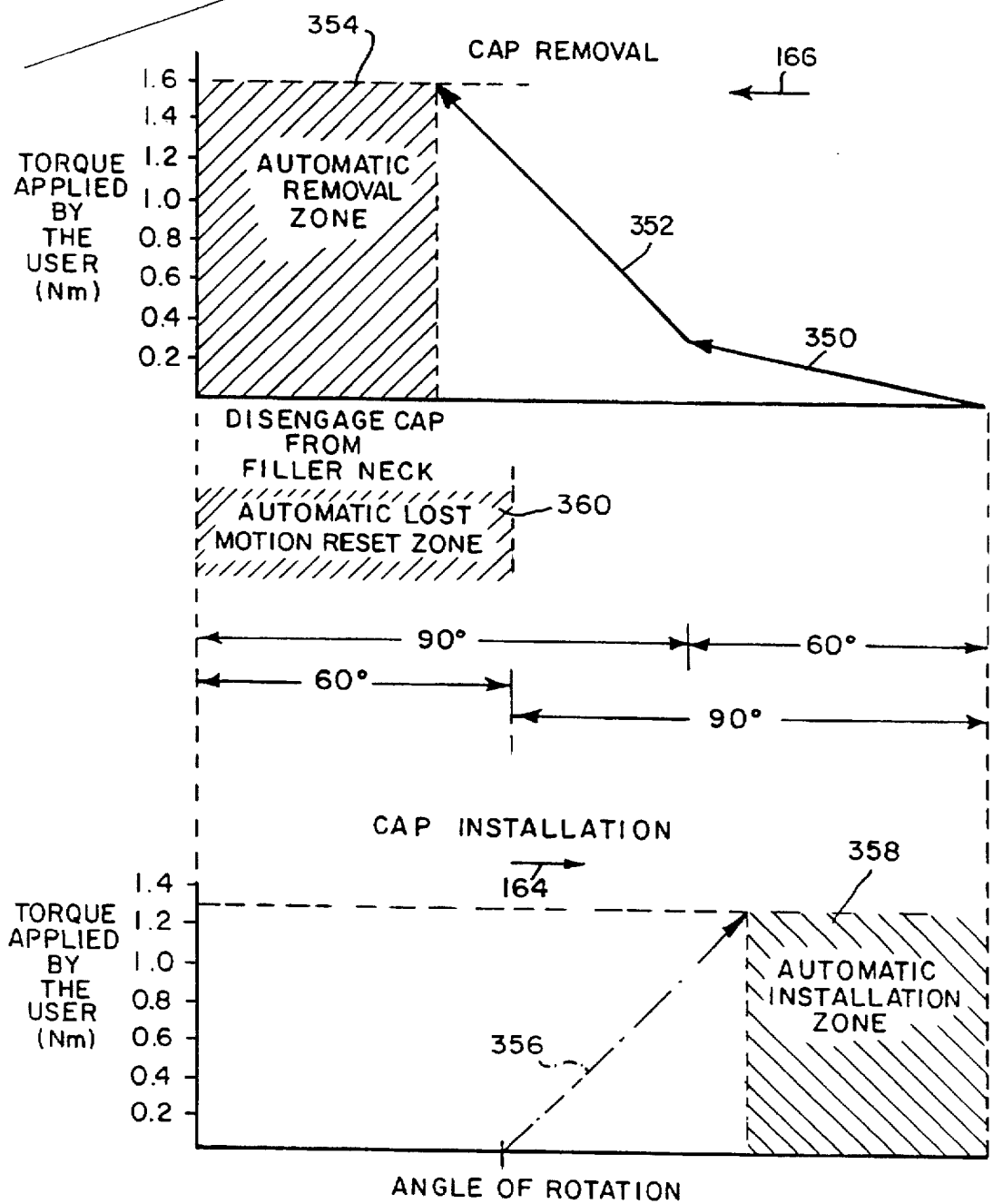
FIG. 12 is a chart graphically representing the torque applied by the user to the preferred quick-on cap during cap removal and cap installation and showing that after the user applies a cap-removal threshold torque during the removal of the quick-on cap from the filler neck an automatic removal sequence initiates followed by an automatic lost-motion reset after disengagement of the cap from the filler neck and that after the user applies a cap installation threshold torque during the installation of the quick-on-cap an automatic installation sequence initiates to complete the installation of the quick-on-cap.

As described above, removal of cap 50 from filler neck 52 includes a lost-motion stage and first and second direct-drive removal stages as indicated by reference numerals 350, 352, and 354 on FIG. 12. Installation of cap 50 includes first and second direct-drive installation stages as indicated by reference numerals 356 and 358 on FIG. 12. FIG. 12 shows the preferred and illustrative torque applied by the user to handle cover 54 as handle cover 54 is rotated relative to filler neck 52 during cap removal and cap installation. FIG. 11 illustratively shows a plan view of cap 50 received by filler neck 50 with handle cover 54 rotated to a partially installed position, and also showing handle cover 54 (in phantom) prior to rotation of handle cover 54 and handle cover (also in phantom) after installation is complete.

As shown in FIGS. 11 and 12, as the user rotates installed cap 50 in cap-removal direction 166, the user initiates lost-motion stage 350. During lost-motion stage 350, the torque that must be applied by the user to continue rotation of handle cover 54 is illustratively small and gradually increases to approximately 0.3 Nm. The increase of required applied torque results from winding-up torsion spring 144 during lost-motion stage 350.

Although the torque applied to preferred and illustrative cap 50 during lost-motion stage 350 increases from a very small torque to approximately 0.3 Nm, the applied torque at each point of the rotation of handle cover 54 can be adjusted without exceeding the scope of the invention as presently perceived. For example, torsion spring 144 can be installed so that torsion spring 144 is tensioned before handle cover 54 is rotated relative to upper housing 62 so that the initial rotation of handle cover 54 relative to upper housing 62 requires the application of torque greater than the very small amount. Likewise, a torsion spring having a different spring constant than torsion spring 144 can be used so that the amount of torque applied by the user at the end of lost-motion stage is greater than or less than 0.3 Nm.

Once lost-motion stage 350 is complete, continued rotation of handle cover 54 in cap-removal direction 166 initiates first direct-drive removal stage 352. During first direct-drive removal stage 352, the torque that must be applied by the user to continue rotation illustratively and preferably increases from the torque applied at the end of lost-motion stage 350, in this case 0.3 Nm, to 1.6 Nm. During first direct-drive removal stage 352, rotation of handle cover 54 results in the compression of power spring 140 as described below with reference to FIGS. 13–25 which in turn requires user to apply increasing torque to continue rotation of handle cover 54.

As with lost-motion stage 350, although the torque applied to preferred and illustrative cap 50 during first direct-drive removal stage 352 increases from approximately 0.3 Nm to approximately 1.6 Nm, the applied torque at each point of the rotation of handle cover 54 can be adjusted without exceeding the scope of the invention as presently perceived. It should be noted that the torque applied at the beginning of first direct-drive removal stage is established by torsion spring 144 as described above so that the torque applied at the beginning of first direct-drive removal stage 352 can be adjusted by adjusting the torque that the user must apply at the end of lost-motion stage 350 as described above. In addition, power spring 140 can be installed so that power spring 140 is partially compressed before handle cover 54 is rotated relative to upper housing 62 to initiate first direct-drive stage 352 so that this rotation of handle cover 54 relative to upper housing 62 requires the application of torque that is greater than torque applied at the end of lost-motion stage 350. Also, a power spring having a different spring constant than power spring 140 can be used so that the amount of torque applied by the user at the end of first direct-drive stage 352 is greater than or less than 1.6 Nm.

Once first direct-drive stage 352 is complete, continued rotation of handle cover 54 in cap-removal direction 166 initiates second direct-drive removal stage 354. During second direct-drive removal stage 352, power spring 140 assists the rotation of handle cover 54 in cap-removal direction 166 and in the illustrative and preferred embodiment power spring 140 operates to power the movement of handle cover 54 in cap-removal direction 166 so that the user does not need to apply torque to handle cover 54 to complete second direct-drive removal stage. Second direct-drive removal stage 354 is thus an automatic removal stage powered by the energy stored in power spring 140 during first direct-drive removal stage 352. When second direct-drive removal stage 354 is complete, the user can disengage cap 50 from filler neck 52.

As with lost-motion stage 350 and first direct-drive removal stage 352, although the assisting torque applied to preferred and illustrative cap 50 during second direct-drive removal stage 354 operates to rotate handle cover 54, the torque applied by power spring 140 can be adjusted without exceeding the scope of the invention as presently perceived so that, for example, the assisting torque is insufficient to rotate handle cover 54 without the intervention of the user. The assisting torque results from the decompression of power spring 140 as described below with respect to FIGS. 13–25, so that adjustments to power spring 140 described above will operate to adjust the torque applied during second direct-drive removal stage 354.

Once the second direct-drive removal stage 354 is complete, the user can disengage cap 50 from filler neck 52. As described above, disengagement of cap 50 from filler neck 52 will operate to automatically reset lost-motion mechanism 58 as shown in lost-motion reset zone 360 of FIG. 12. Lost-motion mechanism 58 is automatically reset by the action of torsion spring 144 as torsion spring 144 "unwinds" using the energy stored in torsion spring 144 during lost-motion stage 350.

Preferred and illustrative cap 50 is configured as described in detail below with reference to FIGS. 13–25 so that handle cover 54 is rotated 600 during lost-motion stage 350 and 90° during first and second direct-drive removal stages 352, 354. Preferably, handle cover 54 is rotated 45° during first direct-drive removal stage 352 and 45° during second direct-drive removal stage 354, although these rotation angles can be adjusted as described below.

Once lost-motion mechanism 58 has been automatically reset, cap 50 can be installed into filler neck 52. After placing cap 50 into filler neck 52 as shown in FIGS. 8 and 11, handle cover 54 is rotated in cap-advancing direction 164 to initiate first direct-drive installation stage 356. Because lost-motion mechanism 58 automatically resets after disengaging from filler neck 52 at the end of the cap removal sequence, the cap installation sequence includes no lost-motion stage. During first direct-drive installation stage 356, the torque applied by the user in cap-advancing direction 164 increases from a very small amount to approximately 1.3 Nm.

As described above with respect to the cap removal sequence, although the torque applied to preferred and illustrative cap 50 during first direct-drive installation stage 356 increases from a very small amount to approximately 1.3 Nm, the applied torque at each point of the rotation of handle cover 54 can be adjusted without exceeding the scope of the invention as presently perceived. For example, power spring 140 can be installed so that power spring 140 is partially compressed before handle cover 54 is rotated relative to upper housing 62 to initiate first direct-drive stage 356 so that this rotation of handle cover 54 relative to upper housing 62 requires the application of torque that is greater than the very small amount. Also, a power spring having a different spring constant than power spring 140 can be used so that the amount of torque applied by the user at the end of first direct-drive installation stage 356 is greater than or less than 1.3 Nm.

Once first direct-drive installation stage 356 is complete, continued rotation of handle cover 54 in cap-advancing direction 164 initiates second direct-drive installation stage 358. During second direct-drive installation stage 358, power spring 140 assists the rotation of handle cover 54 in cap-advancing direction 164 and in the illustrative and preferred embodiment power spring 140 operates to power the movement of handle cover 54 in cap-advancing direction 164 so that the user does not need to apply torque to handle cover 54 to complete second direct-drive installation stage 358. Second direct-drive installation stage 358 is thus an automatic installation stage powered by the energy stored in power spring 140 during first direct-drive installation stage 356 as described below with reference to FIGS. 13–25. When second direct-drive installation stage 358 is complete, cap 50 is fully installed in filler neck 52 to form the seal between lower housing 66 and filler neck side wall 94 preventing the flow of liquid fuel and fuel vapor out of filler neck 52.

Preferred and illustrative cap 50 is configured as described in detail below with reference to FIGS. 13–25 so that handle cover 54 is rotated 90° during first and second direct-drive installation stages 356, 358. Preferably, handle cover 54 is rotated 450 during first direct-drive installation stage 356 and 450 during second direct-drive installation stage 358, although these rotation angles can be adjusted as described below.

As described above, once cap 50 is disengaged from filler neck 52, lost-motion mechanism 58 resets so that a direct-drive driving connection is present in cap-advancing direction 164 as shown in FIGS. 7, 13, and 14. Drive lug 150 of handle cover 54 is received in C-shaped slot 154 formed in top flange 80 of upper housing 62 and engages edge 152 adjacent first driven edge 160 to establish the direct-drive driving connection between handle cover 54 and upper housing 62 as shown best in FIG. 13. Thus, as handle cover 54 rotates in cap-advancing direction 164, flange 80 and upper housing 62 likewise rotate in cap-advancing direction 164.

Upper housing 62 includes drive walls 226 extending in axially inward direction 168 and engaging driven lugs 224 of intermediate housing 136 so that intermediate housing 136 is rotatably fixed to upper housing 62 as shown in FIG. 14. However, drive walls 226 slidably engage driven lugs 224 in the axial directions so that intermediate housing 136 is axially movable relative to upper housing 62. Power spring 140 has a first end engaging inwardly directed ledge 228 of flange 212 and a second end engaging an axially inwardly-facing surface 148 of upper housing 62 so that when power spring 140 is compressed, power spring 140 yieldably biases intermediate housing 136 axially inwardly 168 away from upper housing 62.

Illustrative and preferred bottom edge 216 of intermediate housing 136 is formed to define two first axial ramps 218 spaced apart 180° along bottom edge 216, two second axial ramps 220 each of which opposes a respective first axial ramp 218, and two tips 222, each tip 222 being positioned to lie between respective first and second axial ramps 218, 220 as shown in FIG. 14. Each first axial ramp 218 extends from its respective tip 220 to its respective vertical stop 230.

Each second axial ramp 220 extends from its respective tip 220 to its respective vertical stop 232.

Although illustrative and preferred cap 50 includes two spaced-apart sets of first and second axial ramps 218, 220, tips 222, stops 230, 232, and loading members 244, the operation of each set is substantially similar and the operation of cap 50 will be described below with reference to only one of the above-noted sets with the understanding that the other of the above-noted sets operates in substantially the same manner. It should be noted that even though the illustrative and preferred embodiment includes two of the above-noted sets, cap 50 can include any reasonable number of the above-noted sets without exceeding the scope of the invention as presently perceived.

Loading member 244 of lower housing 66 engages bottom edge 216 adjacent ramps 218, 220, and tip 222 as shown in FIG. 14. As described above, lower housing 66 is rotatably fixed relative to filler neck 52 so that as upper housing 62 and intermediate member 136 rotate relative to filler neck 52, intermediate housing 136 rotates relative to lower housing 66 and bottom edge 216 rotates relative to loading member 244.

As bottom edge 216 rotates relative to loading member 244, top 242 of loading member 244 slidably engages and slides along bottom edge 216. However, when loading member 244 engages stops 230, 232, rotation of intermediate member 136 relative to lower housing 66, and thus rotation of upper housing 62 relative to filler neck 52 is stopped in one direction. For example, when loading member 244 engages stop 230 as shown in FIG. 14 and the user attempts to rotate handle cover 54 in cap-removal direction 166, anti-rotation lugs 68 of lower housing 66 engage lugs 72 of filler neck 52 to prevent rotation of lower housing 66, loading member 244 engages stop 230 to prevent rotation of intermediate housing 136, and driven lugs 224 of intermediate housing 136 engage drive walls 226 of upper housing to prevent rotation of upper housing 62. In the same manner, engagement of loading member 244 with stop 232 will stop rotation of upper housing 62 in cap-advancing direction 164.

When handle cover 54 is rotated in cap-advancing direction 164 from the position in FIGS. 13 and 14, drive lugs 150 engage driven edges 160 to rotate upper housing 62 and intermediate housing 136 in cap-advancing direction 164 and top 242 of loading member 244 slides along first ramp 218. At the end of the first direct-drive installation stage, top 242 of loading member 244 engages tip 222 as shown in FIG. 16.

Lower housing 66 is vertically fixed to upper housing 62 by flange 90 as shown best in FIG. 7. While loading member 244 slides along ramp 218, camming engagement of top 242 of loading member 242 forces intermediate housing 136 axially outwardly to compress power spring 140 as shown in FIG. 16. Thus, as handle cover 54 is rotated in cap-advancing direction 164 during the first direct-drive stage, axial movement of intermediate member 136 caused by the camming engagement between loading member 244 and ramp 218 stores energy in power spring 140.

When handle cover 54 is rotated in cap-advancing direction 164 from the position in FIGS. 15 and 16, drive lugs 150 engage driven edges 160 to rotate upper housing 62 and intermediate housing 136 in cap-advancing direction 164 and top 242 of loading member 244 slides from tip 222 to second ramp 220 to initiate the second direct-drive installation stage. As can be seen, the energy stored in power spring 140 is released during the second direct-drive installation stage to assist the user with the installation of cap 50.

At the end of the second direct-drive installation stage, loading member 244 engages stop 232 as shown in FIG. 18.

When the energy stored by power spring 140 is released, intermediate member 136 is driven axially inwardly 168. The camming engagement of ramp 220 and loading member 244 operates to rotate intermediate member 136 in cap-advancing direction 164 relative lower housing 66. In illustrative and preferred cap 50, power spring 140 has a spring constant such that sufficient energy can be stored in power spring 140 to power the second direct-drive installation stage. However, as mentioned above, power spring 140 can be modified to adjust the amount of energy stored by power spring 140.

The removal of cap 50 from filler neck 52 includes the lost-motion stage, the first direct-drive removal stage, and the second direct-drive removal stage. As described above with respect to FIG. 5, torsion spring 144 includes an end received by bottom spring mount 158 and another end received by slots 192 formed in top spring mount 156 as also shown in FIG. 19. Torsion spring 144 includes a first finger coupled to top spring mount 156, a second finger coupled to bottom spring mount 158, and a coiled portion interconnecting the first and second fingers as shown in FIGS. 5 and 7. The coiled portion defines a passage and the first and second fingers extend across a major diameter of the passage as shown in FIG. 5. The first and second fingers are positioned to lie within the circumference of the coiled portion so that the top and bottom spring mounts 156, 158 are positioned to lie within the passage or circumference of the coiled portion as shown in FIG. 7. The torsion spring 144 has a central axis and is oriented preferably to lie between the handle 54 and the underlying closure 56 so that its central axis is aligned in parallel relation to the axis of rotation of the handle 54 and closure 56 as shown in FIG. 7.

Cap 50 that is fully installed is configured as shown in FIGS. 17 and 18. As the user rotates handle cover 54 in cap-removal direction 166, drive lug 150 slides along C-shaped slot 154 until engaging second driven edge 162 as shown in FIG. 19. Because drive lug 150 slides along C-shaped slot 154, rotation of handle cover 54 during the lost-motion stage does not cause the rotation of upper housing 62. This lost-motion between handle cover 54 and upper housing 62 allows for movement of handle cover 54 as the result of vehicle vibration, minor impacts to handle cover 54, or other causes without affecting upper housing 62 and without affecting the seal formed between lower housing 66 and filler neck cylindrical side wall 94.

As handle cover 54 rotates relative to upper housing 62, an end of torsion spring 144 that is fixed to handle cover 54 rotates relative to an end of torsion spring 144 that is fixed to upper housing 62 to "wind-up" torsion spring and to thereby store energy therein. As torsion spring 144 winds up, the torque that must be applied to handle cover 54 by the user to continue rotation in cap-removal direction 166 increases.

Once handle cover 54 has been rotated through lost-motion angle 170 to the position shown in FIG. 19 having drive lug 150 engaging driven edge 162 of C-shaped slot 154, continued rotation of handle cover 54 operates to initiate the first direct-drive removal stage. During the first direct-drive removal stage, rotation of handle cover 54 operates to rotate upper housing 62 and intermediate housing 136. Upon completion of the first direct-drive removal stage, cap 50 is positioned as shown in FIGS. 20 and 21 having top 242 of loading member 244 engaging tip 22 of bottom edge 216 and having power spring 140 in a compressed state. Although FIG. 21 is identical to FIG. 16 which showed cap 50 at the end of the first direct-drive installation stage, FIG. 15, which corresponds to FIG. 16, differs from FIG. 20 in that drive lug 150 in FIG. 20 engages second driven edge 162 as a result of movement during the lost-motion stage.

When handle cover 54 is rotated in cap-removal direction 166 from the position in FIGS. 20 and 21, drive lugs 150 engage driven edges 162 to rotate upper housing 62 and intermediate housing 136 in cap-advancing direction 164 and top 242 of loading member 244 slides from tip 222 to first ramp 218 to initiate the second direct-drive removal stage. As can be seen, the energy stored in power spring 140 is released during the second direct-drive removal stage to assist the user with the removal of cap 50. At the end of the second direct-drive removal stage, loading member 244 engages stop 230 as shown in FIG. 23.

When the energy stored by power spring 140 is released, intermediate member 136 is driven axially inwardly 168. The camming engagement of ramp 218 and loading member 244 operates to rotate intermediate member 136 in cap-removal direction 166 relative lower housing 66. In illustrative and preferred cap 50, power spring 140 has a spring constant such that sufficient energy can be stored in power spring 140 to power the second direct-drive removal stage. However, as mentioned above, power spring 140 can be modified to adjust the amount of energy stored by power spring 140.

Cap 50 can be disengaged from filler neck 52 when configured as shown in FIGS. 22 and 23. Removal of cap 50 from filler neck 52 allows torsion spring 144 to release the energy stored therein by rotating upper housing 62 relative to handle cover 54 as indicated by double arrow 176 in FIG. 22 through lost-motion angle 170 so that lost-motion mechanism 58 is reset, drive lug 150 engages first driven edge 160, and cap 50 is ready for installation into filler neck 52.

Figure 24:
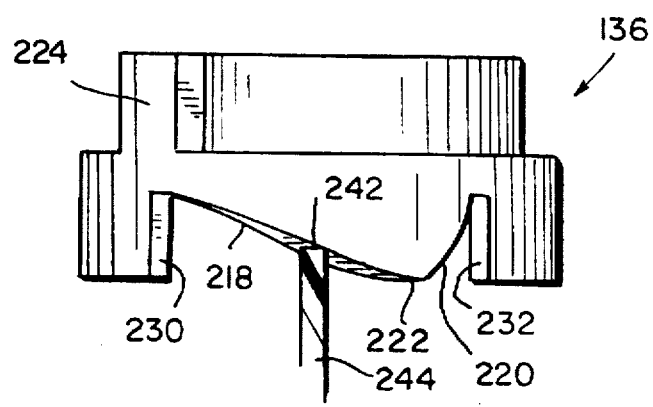
FIG. 24 is an elevation view similar to FIGS. 16 and 21 with portions broken away showing a modification to the first and second ramps of the intermediate member providing a longer and more gradual first installation stage and a longer and more gradual second removal stage to adjust the rate that torque is applied to the handle cover by the user during cap removal and cap installation.

Bottom edge 216 can be reconfigured to adjust the "feel" of the first and second direct-drive installation and removal stages to the user. For example, ramp 218 can be longer than ramp 220 as shown in FIG. 24. This longer ramp will decrease the rate of increase of the application of torque in cap-advancing direction 164 by the user while causing the first direct-drive installation stage to be more than 45° of rotation. Corresponding shorter second ramp 220 will result in an increase in the rate of the application of torque to handle cover 54 by the user during the first direct-drive removal stage.

Figure 25:
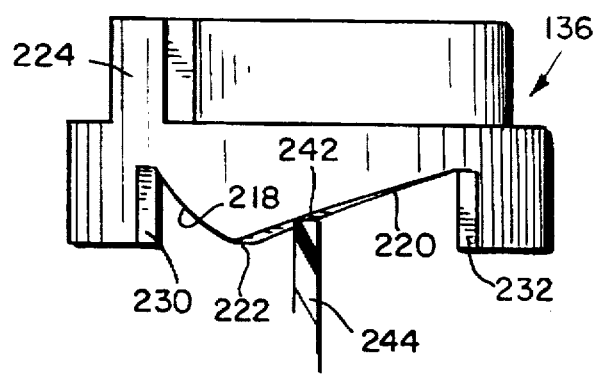
FIG. 25 is a view similar to FIG. 24 showing a different modification to the first and second ramps providing a shorter and less gradual first installation stage and a shorter and less gradual second removal stage to adjust the rate that torque is applied to the handle cover by the user during cap removal and cap installation.

Likewise, ramp 218 can be shorter than ramp 220 as shown in FIG. 25 to provide a result opposite to that described above. In addition, rather than being generally linear, ramps 218, 220 can be curved so that the torque applied by the user during the affected stages increases differently than with illustrative cap 50. It is therefore within the scope of the invention as presently perceived to provide ramps 218, 220 having lengths and shapes other than those provided on the illustrative and preferred embodiment of cap 50.

Ramps 218, 220 allow for lower housing 66 to be moved axially inwardly 168 into filler neck 52 while handle cover 54 is rotated but without causing rotation of lower housing 66 and sealing gasket 76 during cap installation. Eliminating the rotation of sealing gasket 76 minimizes abrasions to sealing gasket 76 that could otherwise occur.

Sealing gasket 76 is received by channel 92 of lower housing 66 as shown in FIGS. 1 and 7. As described above, as lower housing 66 moves axially inwardly 168, sealing gasket 76 engages axial ramp 100 of filler neck side wall 94. Continued axially inward movement of lower housing 66 and sealing gasket 76 results in camming engagement between sealing gasket 76 and axial ramp 100 that radially compresses sealing gasket 76 to form a radial seal between lower housing 66 and cylindrical sealing surface 110 of filler neck 52.

As can be seen, during the axially inward movement of lower housing 66 and sealing gasket 76 along ramp 100 and sealing surface 110, sealing gasket 76 is subjected to shear forces as indicated by arrows 112, 114 in FIG. 8 In addition, when lower housing 66 is removed from filler neck 52, sealing gasket 76 is subjected to shear forces 116, 118 opposite to shear forces 112, 114 acting on sealing gasket 76 during installation of cap 50 in filler neck 52. Although shear forces 112, 114 and 116, 118 would tend to "roll" a conventional o-ring (not shown) axially away from groove 92 much like a rubber band would "roll" along the length of a curled-up newspaper, sealing gasket 76 is configured to resist shear forces 112, 114, 116, 118.

Sealing gasket 76 includes radially inwardly located hoop-shaped base 120, radially outwardly located outer seal 122, and multi-directional connecting membrane 124 therebetween as shown in FIGS. 26–30. Hoop-shaped base 120 is received by groove 92 and is sized to be retained thereon. Hoop-shaped base is formed to include an annular axially outer edge 330 and an annular axially inner edge 332 as shown best in FIGS. 28–30. Outer seal 122 includes upwardly-angled annular upper ramp 126, downwardly-angled annular lower ramp 128, and an annular tip 130 positioned axially therebetween. Outer seal 122 also includes an annular axially outer edge 334 and an annular axially inner edge 336.

Multi-directional connecting membrane 124 includes a plurality of circumferentially extending inclined first portions 338, a plurality of circumferentially extending inclined second portions 340 alternating in series with inclined first portions 338, and a plurality of transition portions 342 positioned to lie between each of the inclined first and second portions 338, 340 as shown best in FIG. 27. First portions 338 extend both axially outwardly and radially outwardly from inner edge 332 of hoop-shaped base 332 to outer edge 334 of outer seal 122 as shown in FIG. 29. Second portions 340 extend both axially inwardly and radially outwardly from outer edge 330 of hoop-shaped base 120 to inner edge 336 of outer seal 122 as shown in FIG. 30. Transition portions 342 are generally X-shaped in cross section having portions engaging all four of outer and inner edges 330, 332 of hoop-shaped base 120 and outer and inner edges 334, 336 of outer seal 122 as shown in FIG. 28.

When sealing gasket 76 is subjected to shear forces 116, 118 as shown in FIG. 29 during the cap removal, first portions 338 of multi-directional connecting membrane 124 operate to prevent axially inward rolling movement of outer seal 122 relative to hoop-shaped base 120. When sealing gasket 76 is subjected to shear forces 112, 114 as shown in FIG. 30 during cap installation, second portions 340 of multi-directional connecting membrane 124 operate to prevent axially outward rolling movement of outer seal 122 relative to hoop-shaped base 120. By alternating first and second portions 338, 340 as shown in FIG. 27, the axial movement of outer seal 122 relative to hoop-shaped base 120 during both cap removal and cap installation is minimized. Thus, multi-directional connecting membrane 124 includes a mechanism for preventing axial movement of a radially outer portion of sealing gasket 76 relative to a radially inner portion of sealing gasket 76 during cap installation and cap removal when the radially inner and outer portions of sealing gasket are subjected to opposing shearing forces.

The seal formed by sealing gasket 76 between lower housing 66 and filler neck 52 prevents the flow of liquid fuel and fuel vapor out of filler neck 52. It will be understood that the pressure in fuel tank 14 could increase or decrease after filling due to changes, for example, in fuel temperature. As shown in FIGS. 5 and 31–33, tank pressure control subassembly 266 includes a pressure-relief valve subassembly 268 and a vacuum-relief valve subassembly 270. Tank pressure control assembly 266 is received in interior region 258 of lower housing 66 and is configured to maintain the tank and filler neck pressure in a range between a predetermined minimum pressure and a predetermined maximum pressure by controlling the flow of pressurized fuel vapor and ambient air between an inlet opening 384 formed in lower housing 66 and an outlet comprising C-shaped openings 154.

Vacuum-relief valve subassembly 270 includes annular vacuum-relief valve 282 which is attached to upper annular valve plate 284 as shown in FIG. 31. Both vacuum-relief valve 282 and plate 284 are formed to include generally centrally-located openings 374, 376, respectively. Lower annular valve plate 286 rests against ledge 288 of lower housing 66 and is axially spaced-apart from plate 284. Vacuum-relief spring 290 is positioned to lie between lower plate 286 and upper plate 284 and to yieldably bias upper plate 284 and vacuum-relief valve 282 axially upwardly into sealing engagement with an axially downwardly-extending annular lip 378 formed on lower housing 66 when tank pressure is above a predetermined minimum pressure.

Pressure-relief valve subassembly 268 includes pressure-relief valve 274 having a downwardly-facing annular lip 370 sealingly engaging a sealing surface 372 formed on vacuum-relief valve 282 when tank pressure is below a predetermined maximum pressure as shown in FIG. 31. Pressure-relief valve 274 extends axially inwardly through openings 374, 376 of vacuum-relief valve 282 and upper plate 284 and is axially moveable with respect thereto. Downwardly-extending retainer pin 278 of pressure-relief valve 274 additionally extends through opening 280 formed in annular valve plate 276 and is fixed thereto so that as pressure-relief valve 274 moves axially relative to cap 50, plate 276 moves along with pressure-relief valve 274.

Vacuum-relief valve subassembly 270 permits ambient air from the atmosphere outside of cap 50, designated by arrows 382, to enter vehicle fuel tank (not shown) when the pressure inside of the vehicle fuel tank is below a predetermined minimum pressure as shown in FIG. 32. Under normal tank pressure conditions with tank pressure above the predetermined minimum pressure, sealing surface 372 of vacuum-relief valve 282 is yieldably urged against annular lip 378 of lower housing 66 by compression spring 290, thereby providing a seal to block the flow of ambient air 382 into the vehicle fuel tank through an opening 292 of lower housing 66 adjacent to annular lip 378 as shown in FIG. 32.

Once the pressure in the vehicle fuel tank decreases below the predetermined subatmospheric minimum pressure, both vacuum-relief valve 282 and pressure-relief valve 274 are drawn inwardly so that vacuum-relief valve 282 moves away from lip 378 and allowing the flow of ambient air 382 from outside of cap 50, through C-shaped slots 154, upper housing 62, opening 292, inlet opening 384, and into filler neck 52 as shown in FIG. 32. Once sufficient ambient air has entered the vehicle fuel tank to raise the pressure in the vehicle fuel tank above the predetermined minimum tank pressure, compression spring 290 yieldably urges vacuum-relief valve 282 and pressure-relief valve 274 axially outwardly so that sealing surface 372 of vacuum-relief valve 282 sealingly engages lip 370 to close opening 292.

It should be understood that the axially-outwardly directed surfaces of pressure-relief valve 274 and vacuum-relief valve 282 cooperate to define a vacuum-relief face 292 as shown in FIG. 32. Vacuum-relief face 292 defines a larger area upon which ambient air 382 can act to cause the pressure-relief and vacuum-relief valves 282, 274 to move to relieve low tank pressure than would be presented by the face of vacuum-relief valve 282 alone. Increasing the area upon which ambient air 382 can act increases the sensitivity of vacuum-relief valve subassembly 270 so that vacuum-relief valve subassembly 270 can respond to smaller pressure differentials between the vehicle fuel tank and the atmosphere. In addition to providing a larger vacuum-relief face 292, cap 50 also provides a larger opening 294 for the flow of ambient air allowing for a greater flow rate of air 382 into the vehicle fuel tank during vacuum-relief conditions.

Pressure-relief valve subassembly 268 permits fuel vapor, designated by arrows 380, from the vehicle fuel tank (not shown) to vent from the vehicle fuel tank when the pressure inside of the vehicle fuel tank is above a predetermined maximum pressure. Under normal tank conditions with tank pressure below the predetermined maximum pressure as shown in FIG. 31, pressure-relief valve subassembly 268 is in its sealing position having axially inwardly-facing lip 370 yieldably urged against sealing surface 372 of vacuum-relief valve 282 by compression spring 272 blocking the flow of fuel vapor 380 through cap 50 thereby preventing the flow of fuel vapor 380 out of the vehicle fuel tank.

Pressure-relief valve 274 is urged axially outwardly away from sealing surface 372 of vacuum-relief valve 282 in response to pressure against pressure-relief valve 274 in excess of a predetermined superatmospheric pressure as shown in FIG. 33. Movement of pressure-relief valve 274 away from sealing surface 372 of vacuum-relief valve 282 opens a vent passageway allowing for the discharge of fuel vapor 380 from the vehicle fuel tank, through inlet opening 384 of lower housing 66, openings 374, 376 of upper plate 284 and vacuum-relief valve 282 as shown in FIG. 33, upper housing 62, and out of cap 50 through C-shaped slots 154. Once sufficient fuel vapor 380 has been discharged from the vehicle fuel tank to lower the pressure in the vehicle fuel tank below the predetermined maximum tank pressure, compression spring 272 yieldably urges annular lip 370 of pressure-relief valve 274 axially inwardly against sealing surface 372 of vacuum-relief valve 282.

Although the invention has been described in detail with reference to a certain preferred embodiment, variations and modifications exist within the scope and spirit of the invention as described and defined in the following claims.

We claim:

1. A fuel cap for use in the filler neck of a tank, the fuel cap comprising a filler neck closure member, a handle engaged to drive the filler neck closure member, and a torsion spring coupled to the handle and to the filler neck closure member.

2. The fuel cap of claim 1, wherein the handle and the filler neck closure member are coupled to rotate relative to one another about an axis of rotation and the torsion spring includes a first finger coupled to the handle, a second finger coupled to the filler neck closure member, and a coiled portion yieldably turning the filler neck closure member relative to the handle about the axis of rotation.

3. The fuel cap of claim 2, wherein the handle includes a top wall and a top spring mount coupled to the top wall and to the first finger of the torsion spring and the filler neck closure member includes a flange and a bottom spring mount situated in a fixed position relative to the flange and coupled to the second finger of the torsion spring.

4. The fuel cap of claim 3, wherein the filler neck closure member is rotatable about an axis of rotation relative to the handle, the coiled portion has a central axis, and the torsion spring is oriented to align the central axis in parallel relation to the axis of rotation of the filler neck closure member.

5. The fuel cap of claim 1, further comprising a lost-motion mechanism coupled to the handle and the filler neck closure member.

6. The fuel cap of claim 5, wherein the lost-motion mechanism includes a drive lug coupled to the handle and first and second driven edges formed on the filler neck closure member.

7. The fuel cap of claim 6, wherein the filler neck closure member is formed to include a C-shaped slot receiving the drive lug, the first driven edge is positioned to define one end of the C-shaped slot, and the second driven edge is positioned to define another end of the C-shaped slot.

8. The fuel cap of claim 7, wherein the handle and the filler neck closure member are coupled to rotate relative to one another about an axis of rotation and the torsion spring includes a first finger coupled to the handle, a second finger coupled to the filler neck closure member, and a coiled portion yieldably turning the filler neck closure member relative to the handle about the axis of rotation to urge the first driven edge of the filler neck closure member into engagement with the drive lug received in the C-shaped slot formed in the filler neck closure member.

9. The fuel cap of claim 6, wherein the handle includes an underside wall, the lost-motion mechanism includes a pair of downwardly extending drive lugs appended to the underside wall, a first pair of driven edges at opposite ends of a first C-shaped slot formed in the filler neck closure member, and a second pair of driven edges at opposite ends of a second C-shaped slot formed in the upper core member, a first of the drive lugs is received in the first C-shaped slot, and a second of the drive lugs is received in the second C-shaped slot.

10. The fuel cap of claim 9, wherein the handle and the filler neck closure member are coupled to rotate relative to one another about an axis of rotation and the torsion spring includes a first finger coupled to the handle, a second finger coupled to the filler neck closure member, and a coiled portion yieldably turning the filler neck closure member relative to the handle about the axis of rotation to urge one of the driven edges in the first pair of driven edges of the filler neck closure member into engagement with the drive lug received in the first C-shaped slot formed in the filler neck closure member and one of the driven edges in the second pair of driven edges of the filler neck closure member into engagement with the drive lug received in the second C-shaped slot formed in the filler neck closure member.

11. The fuel cap of claim 1, wherein the torsion spring includes a first finger coupled to the handle, a second finger coupled to the filler neck closure member, and a coiled portion interconnecting the first and second fingers.

12. The fuel cap of claim 11, wherein the filler neck closure member is rotatable about an axis of rotation relative to the handle, the coiled portion has a central axis, and the torsion spring is oriented to align the central axis in parallel relation to the axis of rotation of the filler neck closure member.

13. The fuel cap of claim 11, wherein the first and second fingers of the torsion spring are positioned to lie within the circumference of the coiled portion of the spring.

14. The fuel cap of claim 11, wherein the coiled portion defines a passage and the first and second fingers extend across the passage.

15. The fuel cap of claim 14, wherein the first and second fingers extend across a major diameter of the passage.

16. The cap of claim 11, wherein the handle includes a top wall and a top spring mount coupled to the top wall and to the first finger of the torsion spring and the filler neck closure member includes a flange and a bottom spring mount situated in a fixed position relative to the flange and coupled to the second finger of the torsion spring.

17. The cap of claim 16, wherein the filler neck closure member is rotatable about an axis of rotation relative to the handle, the coiled portion has a central axis, and the torsion spring is oriented to align the central axis in parallel relation to the axis of rotation of the filler neck closure member.

18. The fuel cap of claim 16, wherein the top and bottom spring mounts are positioned to lie within the circumference of the coiled portion.

19. The fuel cap of claim 16, wherein the coiled portion defines a passage and the top and bottom spring mounts are positioned to lie within the passage.

20. A fuel cap for use in the filler neck of a tank, the fuel cap comprising a filler neck closure member having an axis, a handle connected to the filler neck closure member for limited rotation about the axis, and a torsion spring configured to urge the handle about the axis.

21. The fuel cap of claim 20, wherein the torsion spring includes a first finger coupled to the handle, a second finger coupled to the filler neck closure member, and a coiled portion interconnecting the first and second fingers.

22. The fuel cap of claim 21, wherein the coiled portion has a central axis and the torsion spring is oriented to align the central axis in parallel relation to the axis of the filler neck closure member.

23. The fuel cap of claim 21, wherein the handle includes a top wall and a top spring mount coupled to the top wall and to the first finger of the torsion spring and the filler neck closure member includes a flange rotatable about the axis of the filler neck closure member and a bottom spring mount situated in a fixed position relative to the flange and coupled to the second finger of the torsion spring.

24. The fuel cap of claim 20, wherein the filler neck closure member includes a spring mount and an annular flange around the spring mount and the torsion spring is coupled to the spring mount.

25. The fuel cap of claim 24, wherein the torsion spring includes a coiled portion and a finger appended to the coiled portion and coupled to the spring mount.

26. The fuel cap of claim 24, further comprising a lost-motion connector that includes a drive lug appended to the handle and oriented to project toward the annular flange and a pair of spaced-apart driven edges formed on the annular flange and positioned relative to one another to receive the drive lug therebetween.

27. The fuel cap of claim 26, wherein the annular flange is formed to include a C-shaped slot extending between the spaced-apart driven edges and receiving the drive lug therein.

28. The fuel cap of claim 20, further comprising a lost-motion connector that includes first and second drive lugs appended to the handle and positioned to lie in spaced-apart relation to receive the torsion spring therebetween, a first pair of spaced-apart driven edges formed on the filler neck closure member and positioned relative to one another to receive the first drive lug therebetween, and a second pair of spaced-apart driven edges formed on the filler neck closure member and positioned relative to one another to receive the second drive lug therebetween.

29. The fuel cap of claim 28, wherein the filler neck closure member is formed to include a first C-shaped slot extending between a first driven edge and a second driven edge in the first pair of driven edges and receiving the first drive lug therein and a second C-shaped slot extending between a first driven edge and a second driven edge in the second pair of driven edges and receiving the second drive lug therein.

30. The fuel cap of claim 28, wherein the filler neck closure member includes a spring mount and an annular flange around the spring mount, the annular flange is formed to include the first and second pairs of driven edges, and the torsion spring is coupled to the spring mount.

31. The fuel cap of claim 30, wherein the annular flange is formed to include a first C-shaped slot extending between a first driven edge and a second driven edge in the first pair of driven edges and receiving the first drive lug therein and a second C-shaped slot extending between a first driven edge and a second driven edge in the second pair of driven edges and receiving the second drive lug therein.

32. A fuel cap for use in the filler neck of a tank, the fuel cap comprising a filler neck closure member, a handle engaged to drive the filler neck closure member about an axis of rotation relative to one another, and means for turning the filler neck closure member relative to the handle about the axis of rotation each time the filler neck closure member is removed from a filler neck to reset the handle automatically to a predetermined position relative to the filler neck closure member about the axis of rotation.

33. The fuel cap of claim 32, wherein the turning means includes a torsion spring coupled to the handle and the filler neck closure member.

34. The fuel cap of claim 33, wherein the torsion spring includes a first finger coupled to the handle, a second finger coupled to the filler neck closure member, and a coiled portion interconnecting the first and second fingers.

35. The fuel cap of claim 34, wherein the filler neck closure member is rotatable about an axis of rotation relative to the handle, the coiled portion has a central axis, and the torsion spring is oriented to align the central axis in parallel relation to the axis of rotation of the filler neck closure member.

36. The fuel cap of claim 35, further comprising a lost-motion mechanism including a drive lug coupled to the handle and first and second driven edges formed on the filler neck closure member and wherein the drive lug engages one of the first and second driven edges when the handle occupies said predetermined position established by the turning means.

37. The fuel cap of claim 36, wherein the filler neck closure member is formed to include a C-shaped slot receiving the drive lug, the first driven edge is positioned to define one end of the C-shaped slot, and the second driven edge is positioned to define another end of the C-shaped slot.

38. A fuel cap for use in the filler neck of a tank, the fuel cap comprising a closure member for insertion into the filler neck and rotation about its axis, a handle configured to insert and remove the closure member, a lost-motion mechanism configured to provide a driving connection between the closure member and the handle, and a spring configured to rotate the handle in one direction about the axis relative to the closure member.

39. The fuel cap of claim 38, wherein the handle is movable between first and second positions relative to the closure member and the spring is configured always to bias the handle toward the first position.

40. The fuel cap of claim 38, wherein the lost-motion mechanism includes a drive lug appended to the handle and a driven lug appended to the closure member and the spring is configured always to bias the drive lug toward engagement with the driven lug.

41. The fuel cap of claim 38, wherein the closure member is adapted to be inserted into the filler neck upon movement of the handle in a first direction and removed from the filler neck upon movement of the handle in a second direction and the spring is configured to bias the handle in the first direction relative to the closure member so that rotation of the handle in the first direction results in direct movement of the closure member.

42. The fuel cap of claim 41, wherein the lost-motion mechanism includes a drive lug appended to the handle and a driven lug appended to the closure member and the spring is configured to bias the drive lug into engagement with the driven lug.

43. In a fuel cap having a filler neck closure member, a handle engaged to drive the filler neck closure member, and a lost-motion mechanism coupled to the handle and the filler neck closure member, the improvement comprising a torsion spring coupled to the handle and to the filler neck closure member and configured to yieldably urge the filler neck closure member about the axis of rotation to a predetermined position relative to the handle.

44. The improvement of claim 43, wherein the torsion spring includes a first finger coupled to the handle, a second finger coupled to the filler neck closure member, and a coiled portion interconnecting the first and second fingers.

45. The improvement of claim 44, wherein the coiled portion has a central axis and the torsion spring is oriented to align the central axis in parallel relation to the axis of rotation of the filler neck closure member.

46. The improvement of claim 44, wherein the handle includes a top wall and a top spring mount coupled to the top wall and to the first finger of the torsion spring and the filler neck closure member includes a flange and a bottom spring mount situated in a fixed position relative to the flange and coupled to the second finger of the torsion spring.

47. The improvement of claim 43, wherein the filler neck closure member includes a spring mount and an annular flange around the spring mount and the torsion spring is coupled to the spring mount.

48. The improvement of claim 47, wherein the torsion spring includes a coiled portion and a finger appended to the coiled portion and coupled to the spring mount.

49. The improvement of claim 47, wherein the lost-motion mechanism includes a drive lug appended to the handle and oriented to project toward the filler neck closure member and a pair of spaced-apart driven edges formed on the annular flange and positioned relative to one another to receive the drive lug therebetween.

50. The improvement of claim 49, wherein the filler neck closure member is formed to include a C-shaped slot extending between the spaced-apart driven edges and receiving the drive lug therein.

51. The improvement of claim 43, wherein the lost-motion mechanism includes first and second drive lugs appended to the handle and positioned to lie in spaced-apart relation to receive the torsion spring therebetween, a first pair of spaced-apart driven edges formed on the filler neck closure member and positioned relative to one another to receive the first drive lug therebetween, and a second pair of spaced-apart driven edges formed on the filler neck closure member and positioned relative to one another to receive the second drive lug therebetween.

52. The improvement of claim 51, wherein the filler neck closure member is formed to include a first C-shaped slot extending between a first driven edge and a second driven edge in the first pair of driven edges and receiving the first drive lug therein and a second C-shaped slot extending between a first driven edge and a second driven edge in the second pair of driven edges and receiving the second drive lug therein.

53. The improvement of claim 51, wherein the filler neck closure member includes a spring mount and an annular flange around the spring mount, the annular flange is formed to include the first and second pairs of driven edges, and the torsion spring is coupled to the spring mount.

54. The improvement of claim 53, wherein the annular flange is formed to include a first C-shaped slot extending between a first driven edge and a second driven edge in the first pair of driven edges and receiving the first drive lug therein and a second C-shaped slot extending between a first driven edge and a second driven edge in the second pair of driven edges and receiving the second drive lug therein.

* * * * *